US010295724B2

(12) United States Patent
Thompson et al.

(10) Patent No.: US 10,295,724 B2
(45) Date of Patent: *May 21, 2019

(54) BACK-LIT TRANSMISSIVE DISPLAY HAVING VARIABLE INDEX LIGHT EXTRACTION LAYER

(71) Applicant: 3M INNOVATIVE PROPERTIES COMPANY, St. Paul, MN (US)

(72) Inventors: David Scott Thompson, Bayport, MN (US); Kevin R. Schaffer, Woodbury, MN (US); Zhaohui Yang, North Oaks, MN (US); Encai Hao, Woodbury, MN (US); Audrey A. Sherman, Woodbury, MN (US); Michael A. Meis, Stillwater, MN (US); John A. Wheatley, Lake Elmo, MN (US); Matthew S. Stay, Minneapolis, MN (US); Robert F. Kamrath, Mahtomedi, MN (US); Mikhail L. Pekurovsky, Bloomington, MN (US); Steven D. Solomonson, Shoreview, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 188 days.

This patent is subject to a terminal disclaimer.

(21) Appl. No.: 15/292,817

(22) Filed: Oct. 13, 2016

(65) Prior Publication Data
US 2017/0031078 A1 Feb. 2, 2017

Related U.S. Application Data

(63) Continuation of application No. 14/116,806, filed as application No. PCT/US2012/037007 on May 9, 2012, now Pat. No. 9,541,701.
(Continued)

(51) Int. Cl.
*F21V 8/00* (2006.01)
*F21L 4/02* (2006.01)
(Continued)

(52) U.S. Cl.
CPC .......... *G02B 6/005* (2013.01); *G02B 6/0055* (2013.01); *G02B 6/0056* (2013.01);
(Continued)

(58) Field of Classification Search
None
See application file for complete search history.

(56) References Cited

U.S. PATENT DOCUMENTS

| 3,718,712 A | 2/1973 | Tushaus |
| 4,985,809 A | 1/1991 | Matsui |

(Continued)

FOREIGN PATENT DOCUMENTS

| CN | 1811549 | 8/2006 |
| WO | WO 95/17303 | 6/1995 |

(Continued)

OTHER PUBLICATIONS

Hayes, "Video-Speed Electronic Paper Based on Electrowetting", Nature, Sep. 2003, vol. 425, pp. 383-385.
(Continued)

*Primary Examiner* — Anh T Mai
*Assistant Examiner* — Zachary J Snyder
(74) *Attorney, Agent, or Firm* — Clifton F. Richardson

(57) ABSTRACT

This application describes a back-lit transmissive display including a transmissive display and a variable index light extraction layer optically coupled to a lightguide. The variable index light extraction layer has first regions of nano-voided polymeric material and second regions of the nano-voided polymeric material and an additional material. The first and second regions are disposed such that for light being transported at a supercritical angle in the lightguide, the variable index light extraction layer selectively extracts the light in a predetermined way based on the geometric arrangement of the first and second regions. The transmissive display may be a transmissive display panel or a polymeric film such as a graphic.

19 Claims, 13 Drawing Sheets

Related U.S. Application Data

(60) Provisional application No. 61/485,881, filed on May 13, 2011.

(51) Int. Cl.

| | | |
|---|---|---|
| *F21L 4/08* | (2006.01) | |
| *F21S 6/00* | (2006.01) | |
| *F21S 9/02* | (2006.01) | |
| *F21V 3/00* | (2015.01) | |
| *F21V 15/01* | (2006.01) | |
| *F21V 15/04* | (2006.01) | |
| *F21V 23/04* | (2006.01) | |
| *F21V 23/06* | (2006.01) | |
| *F42B 12/42* | (2006.01) | |
| *F21W 131/40* | (2006.01) | |
| *F21Y 101/00* | (2016.01) | |
| *F21Y 105/14* | (2016.01) | |
| *F21Y 107/40* | (2016.01) | |
| *F21Y 115/10* | (2016.01) | |
| *F21S 8/08* | (2006.01) | |
| *F21V 19/04* | (2006.01) | |
| *F21V 23/00* | (2015.01) | |
| *F21V 21/116* | (2006.01) | |

(52) U.S. Cl.
CPC .......... *G02B 6/0066* (2013.01); *G02B 6/0043* (2013.01); *G02B 6/0058* (2013.01)

(56) References Cited

U.S. PATENT DOCUMENTS

| | | | |
|---|---|---|---|
| 5,357,405 A | 10/1994 | Park | |
| 5,396,350 A | 3/1995 | Beeson | |
| 5,825,543 A | 10/1998 | Ouderkirk | |
| 5,845,038 A | 12/1998 | Lundin | |
| 5,867,316 A | 2/1999 | Carlson | |
| 5,882,774 A | 3/1999 | Jonza | |
| 6,247,826 B1 | 6/2001 | Funamoto | |
| 6,288,172 B1 | 9/2001 | Goetz | |
| 6,352,761 B1 | 3/2002 | Hebrink | |
| 6,367,941 B2 | 4/2002 | Lea | |
| 6,368,699 B1 | 4/2002 | Gilbert | |
| 6,379,017 B2 | 4/2002 | Nakabayashi | |
| 6,425,675 B2 | 7/2002 | Onishi | |
| 6,473,554 B1 | 10/2002 | Pelka | |
| 6,569,521 B1 | 5/2003 | Sheridan | |
| 6,742,907 B2 | 6/2004 | Funamoto | |
| 6,752,505 B2 | 6/2004 | Parker | |
| 6,827,458 B2 | 12/2004 | Suga | |
| 6,927,900 B2 | 8/2005 | Liu | |
| 6,950,155 B2 | 9/2005 | Umemoto | |
| 7,004,610 B2 | 2/2006 | Yamashita | |
| 7,005,394 B1 | 2/2006 | Ylitalo | |
| 7,481,563 B2 | 1/2009 | David | |
| 7,502,081 B2 | 3/2009 | Umemoto | |
| 7,525,126 B2 | 4/2009 | Leatherdale | |
| 7,862,898 B2 | 1/2011 | Sherman | |
| 7,892,649 B2 | 2/2011 | Sherman | |
| 8,033,706 B1 | 10/2011 | Kelly et al. | |
| 8,469,575 B2 | 6/2013 | Weber | |
| 2001/0013668 A1 | 8/2001 | Neavin | |
| 2001/0053075 A1* | 12/2001 | Parker | A61M 21/02 362/617 |
| 2004/0202879 A1 | 10/2004 | Xia | |
| 2006/0084780 A1 | 4/2006 | Hebrink | |
| 2006/0216523 A1 | 9/2006 | Takaki | |
| 2007/0047254 A1 | 3/2007 | Schardt | |
| 2007/0047262 A1 | 3/2007 | Schardt | |
| 2007/0058391 A1 | 3/2007 | Wilson | |
| 2007/0082969 A1 | 4/2007 | Malik | |
| 2007/0212535 A1 | 9/2007 | Sherman | |
| 2007/0252923 A1 | 11/2007 | Hwang | |
| 2007/0257270 A1 | 11/2007 | Lu | |
| 2008/0089093 A1 | 4/2008 | Miller | |
| 2009/0091949 A1 | 4/2009 | Lee | |
| 2010/0067257 A1 | 3/2010 | Meis | |
| 2010/0141869 A1 | 6/2010 | Biernath et al. | |
| 2011/0039099 A1 | 2/2011 | Sherman | |
| 2012/0268967 A1 | 10/2012 | Wang | |

FOREIGN PATENT DOCUMENTS

| | | |
|---|---|---|
| WO | WO 95/17691 | 6/1995 |
| WO | WO 95/17692 | 6/1995 |
| WO | WO 95/17699 | 6/1995 |
| WO | WO 96/19347 | 6/1996 |
| WO | WO 97/01440 | 1/1997 |
| WO | WO 97/36131 | 10/1997 |
| WO | WO 99/36248 | 7/1999 |
| WO | WO 99/36262 | 7/1999 |
| WO | WO 2009/085662 | 7/2009 |
| WO | WO 2009/089137 | 7/2009 |
| WO | WO 2009/114683 | 9/2009 |
| WO | WO 2010/005655 | 1/2010 |
| WO | WO 2010/077541 | 7/2010 |
| WO | WO 2010/078346 | 7/2010 |
| WO | WO 2010/120422 | 10/2010 |
| WO | WO 2010/120468 | 10/2010 |
| WO | WO 2010/131430 | 11/2010 |
| WO | WO 2010/132176 | 11/2010 |
| WO | WO 2011/088161 | 7/2011 |
| WO | WO 2012/061296 | 5/2012 |
| WO | WO 2012/116129 | 8/2012 |
| WO | WO 2012/116199 | 8/2012 |
| WO | WO 2012/116215 | 8/2012 |

OTHER PUBLICATIONS

Heikenfeld, "Electrofluidic displays using Young-Laplace transposition of brilliant pigment dispersions",Nature Photonics, Apr. 2009, vol. 3, pp. 292-296.

Koch, "Novel Flexible Reflective Color Media With Electronic Inks", Journal of Information Display, Mar. 2011, vol. 12, No. 1, pp. 5-10.

"3M Optical Systems Vikuiti™ Transmissive Right Angle Film II", 2010, 2 pages.

Hagood, "Pixtronix DMS Display Technology: Ultra-Low Power Consumption and Exceptional Video Image Quality", Pixtronix, 2008, 3 pages.

* cited by examiner

BACK-LIT TRANSMISSIVE DISPLAY HAVING VARIABLE INDEX LIGHT EXTRACTION LAYER

FIELD

This application relates generally to illuminated display devices, particularly display devices that are back-lit with an illumination device.

BACKGROUND

Illumination systems or devices, such as those used to illuminate objects or provide illumination in an electronic display system, utilize one or more optical layers for managing light emitted by one or more light sources. Often, the optical layers are required to have a desired optical transmittance, optical haze, optical clarity, or index of refraction. In many applications, the optical layers include a lightguide used in combination with an air layer and a light extraction layer such that light emitted by the light source(s) is transported within the lightguide, and the air layer and the extraction layer manage the light by supporting total internal reflection (TIR) and extraction of the light from the lightguide. A continuing need exists for optical films which are capable of managing light and are suitable for use in thin, flexible systems as well as in bulky systems.

SUMMARY

This application generally relates to back-lit transmissive display devices. Transmissive displays are back-lit using an illumination device comprising a light source used in conjunction with an illumination article. The illumination article comprises, in particular, a variable index light extraction layer having regions of different properties such as refractive index, haze, transmission, clarity, or a combination thereof. The illumination article also comprises a lightguide which delivers light from a light source to the variable index light extraction layer. The illumination article manages light emitted by the light source, thus increasing the spatial uniformity of the light, which is then delivered to the transmissive display. This light is transmitted through the transmissive display toward a viewer such that images provided by the transmissive display are illuminated.

In one aspect, this application describes a back-lit transmissive display assembly including a transmissive display and an illumination article. The illumination article includes a lightguide and a variable index light extraction layer optically coupled to the lightguide and the transmissive display. The variable index light extraction layer has first and second regions, the first region including nanovoided polymeric material, the second region including the nanovoided polymeric material and an additional material, the first and second regions being disposed such that for emitted by a light source and injected into the lightguide, the variable index light extraction layer selectively extracts the light in a predetermined way based on the geometric arrangement of the first and second regions.

The illumination article can function as a high performance optical article having optical properties tailored for different applications. For example, the first region can have a haze less than about 5% and a clarity greater than about 90%, and/or the layer can have a light transmittance of greater than about 90%. For another example, the layer can have a haze less than about 10% and a clarity greater than about 90%. The first and second regions can be continuous across a transverse plane of the layer, or they can be discontinuous, arranged in a pattern or randomly disposed. The variable index light extraction layer can be tailored to exhibit particular optical properties varying the relative areas of the first and second regions. For example, the second regions can comprise from about 5 to about 60% of an area across a transverse plane of the layer.

The above summary is not intended to describe each disclosed embodiment or every implementation of this disclosure. The figures and the detailed description below more particularly exemplify illustrative embodiments.

BRIEF DESCRIPTION OF DRAWINGS

In the following description, reference is made to the accompanying set of drawings that form a part of this disclosure and in which are shown various general and specific embodiments. It is to be understood that other embodiments are contemplated and may be made without departing from the scope or spirit of the invention. The following detailed description, therefore, is not to be taken in a limiting sense. The figures are schematic drawings and are not necessarily to scale.

FIG. 4b illustrates the refractive index profile for the variable index light extraction layer shown in FIG. 4a.

FIGS. 4c and 4d show profiles for selected optical properties % transmission and % clarity, respectively, for the variable light extraction layer shown in FIG. 4a.

FIG. 14b shows a plot of axial luminance as a function of position for the exemplary illumination device of FIG. 14a.

DETAILED DESCRIPTION

In general, the variable index light extraction layer disclosed herein comprises at least two different areas or regions, wherein light of any angle incident upon the layer can be managed differently because the regions have different refractive indices. The variable index light extraction layer can be used in a variety of optical film constructions, assemblies and devices as described herein.

Figure 12A:
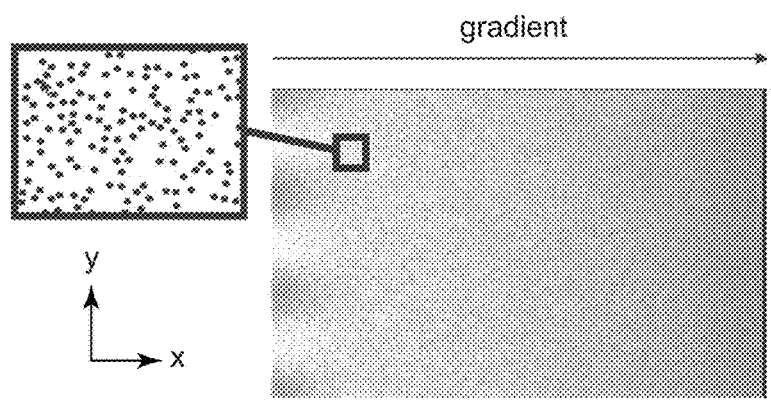
FIG. 12a shows a random gradient dot pattern for an exemplary flexographic tool.
Figure 12B:
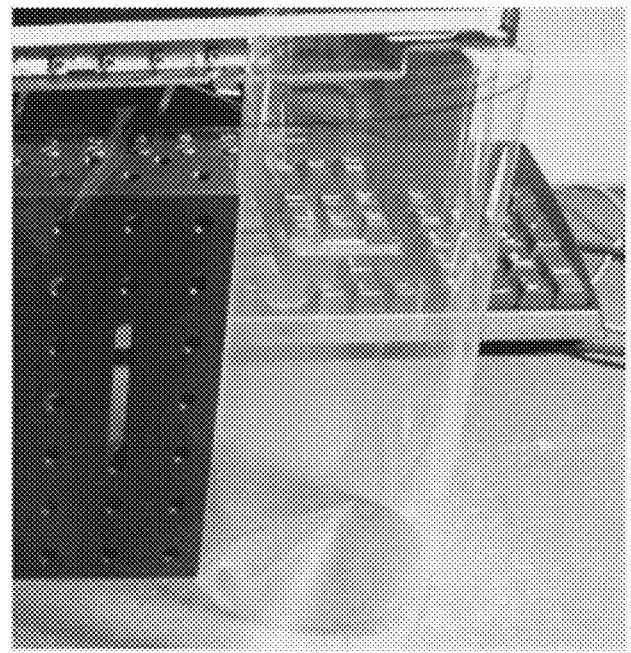
FIG. 12b shows a roll of an optical film comprising a variable index light extraction layer disposed on a transparent substrate.

The variable index light extraction layer is an optical layer that acts to extract light traveling in an adjacent layer at supercritical angles, while at the same time has little to no light scattering for subcritical angle light incident on the extraction layer. The variable index light extraction layer extracts light from an adjacent layer such as a transparent layer, and can deliver the extracted light to an article or element such that the article or element is illuminated. The variable index light extraction layer does not have features that significantly or functionally scatter light. Thus, when looking through the layer, as shown in FIG. 12b, there is little distortion of images and objects on the opposite side of the layer. Ideally, the materials in first and second regions have different refractive indices, and both are highly transmissive with very low haze. The first and second regions in the variable index light extraction layer can be shaped and arranged to yield a layer with high clarity, low haze and high transmission when the layer is physically attached and optically coupled to a lightguide, transmissive display panel, signage and the like.

The variable index light extraction layer allows the lightguide to be transparent exhibiting little to no haze and high clarity with and without illumination. This allows for viewing of images on a transmissive display panel or of a graphic without significant reduction in resolution and contrast, and without visible optical artifacts generated by light scattered or diffracted by different regions. In traditional lightguides, extraction layers have light scattering features in order for light being transported within the lightguide by TIR (at angles equal to or greater than the critical angles) in a lightguide to be directed out of the lightguide. These light scattering features that typically comprise diffuse reflective printed extraction dots or structures that are disposed on or are etched into the surface of the lightguide.

In addition to optical benefits, the variable index light extraction layer can be produced by relatively simple coating and printing techniques amenable to high speed, low cost manufacturing.

This disclosure generally relates to polymeric optical films or layers that exhibit regions of high index-like optical properties and low index-like optical properties, or otherwise interact with the transmission, scattering, absorption, refraction or reflection of light. The regions of high index-like optical properties and low index-like optical properties vary across a transverse plane of the optical layer, that is, the optical layer is a variable index optical layer. Throughout this disclosure, the term "index" is often used in place of index of refraction or refractive index. The transverse plane of a variable index light extraction layer disclosed herein can be described as a plane that is parallel to at least one major surface of the layer.

Figure 1A:
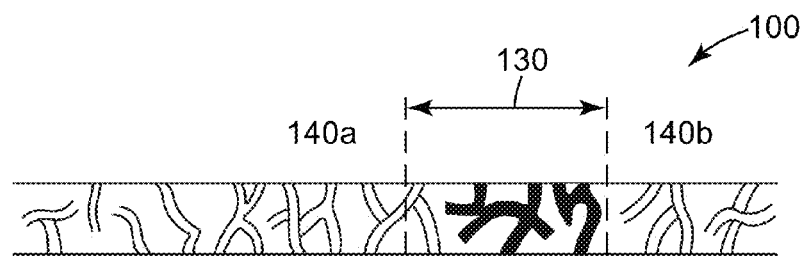
FIG. 1a shows a schematic cross section of an exemplary variable index light extraction layer.

FIG. 1a shows a schematic cross section of an exemplary variable index light extraction layer 100. The extraction layer comprises first regions 140a and 140b, both regions comprising a nanovoided polymeric material. In some embodiments, the nanovoided polymeric material comprises a plurality of interconnected nanovoids as described in WO 2010/120422 A1 (Kolb et al.) and WO 2010/120468 A1 (Kolb et al.). The plurality of interconnected nanovoids is a network of nanovoids dispersed in a binder wherein at least some of the nanovoids are connected to one another via hollow tunnels or hollow tunnel-like passages. Nanovoided polymeric material comprising interconnected nanovoids have nanovoids or pores that can extend to one or more surfaces of the material.

The variable index light extraction layer comprises second region 130 disposed between first regions 140a and 140b. The second region comprises the nanovoided polymeric material and an additional material. In some embodiments, this additional material occupies at least a portion of the void volume of the nanovoided polymeric material. Throughout this disclosure, dashed lines in cross section and plan views are used to indicate general location of the first and second regions, however, these dashed lines are not meant to describe any sort of boundary between the regions.

Figure 1B:
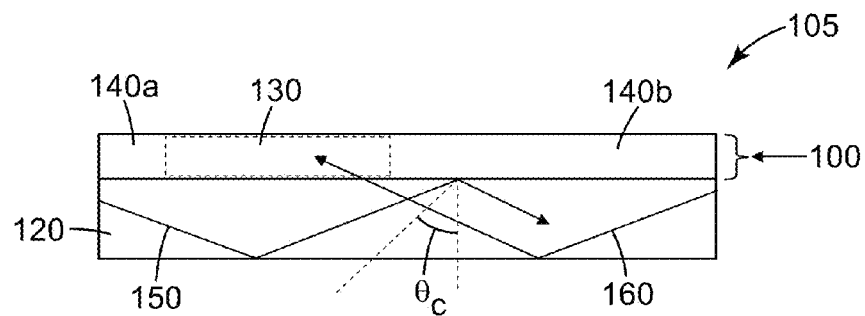
FIGS. 1b-1c show schematic cross sections of an exemplary variable index light extraction layer disposed on a transparent adjacent layer.

FIG. 1b shows a schematic cross section of an exemplary variable index light extraction layer disposed on a transparent adjacent layer. Optical film 105 comprises variable index light extraction layer 100 disposed on adjacent layer 120 which is a transparent substrate. Variable index light extraction layer 100 comprises first regions 140a and 140b, and second region 130 disposed between the first regions.

In general, an area or region is identified by the material it comprises in combination with the refractive index of the region. The first region comprises a nanovoided polymeric material and has a first refractive index. A first region is identified if substantially all of the region comprises the nanovoided polymeric material and if the region has a refractive index within ±0.02 across a continuous transverse plane of the layer. Methods for determining the refractive index across a transverse plane of the layer are described below.

The second region comprises the nanovoided polymeric material and an additional material, and has a second refractive index that is different from the first refractive index by at least about 0.03. The nanovoided polymeric material is the same material in both the first and second regions. A material is considered an additional material if it is incorporated substantially within the variable index light extraction layer and causes a change in refractive index of the first region by at least about 0.03, for example, from about 0.03 to about 0.5, from about 0.05 to about 0.5, or from about 0.05 to about 0.25.

In some embodiments, the additional material is different from the binder used to form the nanovoided polymeric material. In some embodiments, the additional material is the same as the binder used to form the nanovoided polymeric material. A second region is identified if (i) all of the region comprises the nanovoided polymeric material, (ii) the region has a refractive index within ±0.02 across a continuous transverse plane of the variable index light extraction layer, and (iii) the region has a refractive index that is different from that of the first region by at least about 0.03.

In some embodiments, the variable index light extraction layer can be made by combining an additional material with portions of the nanovoided polymeric material that has been formed into some desirable shape such as a layer. Enough of the additional material is combined with the nanovoided polymeric material such that the desired change in refractive index results, and which is at least about 0.03, for example, from about 0.03 to about 0.5, from about 0.05 to about 0.5, or from about 0.05 to about 0.25.

The variable index light extraction layer comprises the first and second regions disposed relative to each other such that for light being transported at supercritical angles in an adjacent layer, the variable index light extraction layer selectively extracts the light in a predetermined way based on the geometric arrangement of the first and second regions. As used herein, supercritical angles are angles that are equal to or greater than the critical angle for a given interface formed by the first region of the variable index light extraction layer and the adjacent layer, is determined by the refractive index difference between the first region and the adjacent layer. The critical angle is the smallest angle of incidence at which a light ray passing from one medium to another less refractive medium can be totally reflected from the boundary between the two.

Referring to FIG. 1b, which is a simplified view of FIG. 1a, light represented by rays 150 and 160 are being transported within adjacent layer 120 by TIR. In this embodiment, the refractive index of first regions 140a and 140b are that much less than that of the adjacent layer which defines critical angle $]_c$ as shown. Light traveling at a supercritical angle represented by ray 150 strikes an interface between adjacent layer 120 and first region 140b, and this angle of incidence for ray 150 is greater than $□_c$, which results in substantially all of the light being reflected at the interface.

Also in this embodiment, the refractive index of second region 130 is approximately equal to or greater than that of adjacent layer 120. In this circumstance there is no critical angle at the interface and the light represented by ray 160 passes through the interface between adjacent layer 120 and second region 130, thus being extracted from the adjacent layer into the second region 130.

Thus, for the embodiment shown in FIG. 1a and FIG. 1b, the first and second regions are disposed relative to each other such that light being transported at supercritical angles in an adjacent layer can be extracted selectively by the variable index light extraction layer in a predetermined way based on the geometric arrangement of the first and second regions.

Figure 1C:
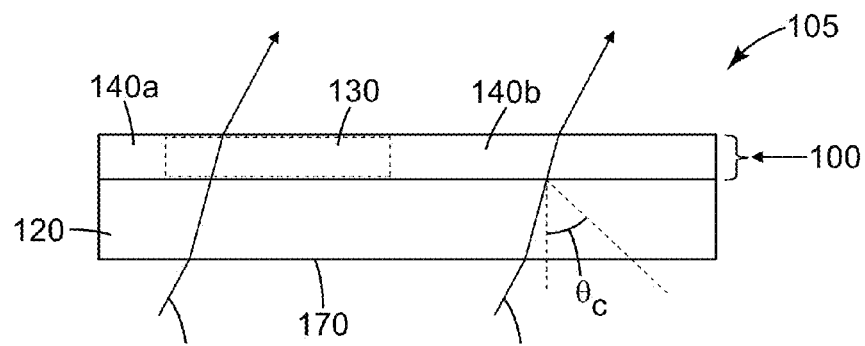

FIG. 1c shows the schematic cross section of optical film 105 with light at subcritical angles impinging on the adjacent layer. Light represented by rays 180 and 190 impinges at subcritical angles on surface 170 of adjacent layer 120, and the light travels essentially undeviated through layers 120 and 100. Light represented by ray 190 travels through first region 140b, and light represented by ray 180 travels through second region 130. There is little to no deviation of light travelling through the different regions of variable index light extraction layer 100. This results in an optical film, such as exemplary optical film 105, that has low haze and high clarity, such that when one looks through the optical film there is little to no distortion of images on the opposite side. The variable index light extraction layer can have any geometric arrangement of first and second regions to produce the desired extracted light pattern.

Figure 2:
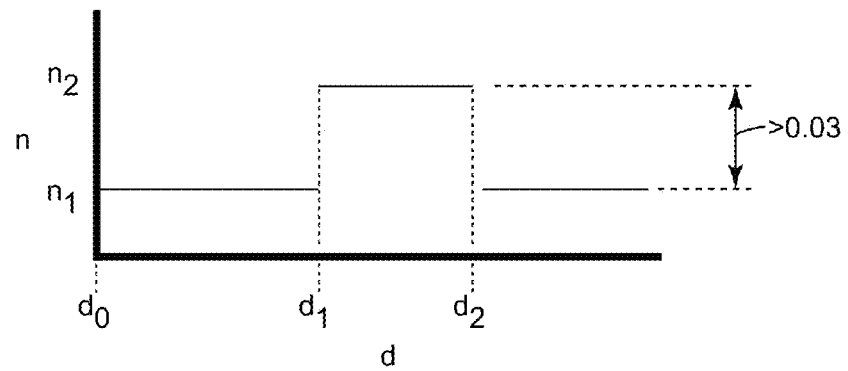
FIG. 2 illustrates the variable index light extraction layer having refractive indices that can vary across a transverse plane of the layer.

In general, the refractive index profile of the variable index light extraction layer may vary in any way, as long as the desired optical performance of the layer is obtained. FIG. 2 illustrates the variable index light extraction layer having refractive indices that can vary across a transverse plane of the layer. The refractive index profile shows a plot of distance d, which corresponds to a distance across a transverse plane of the layer, for the layer in plan view. FIG. 2 shows that at some initial position on the layer corresponding to $d_0$, the layer has first refractive index $n_□$ corresponding to the first region. Moving across the transverse plane of the layer, first refractive index $n_□$ is observed until reaching $d_1$ where the refractive index of the layer abruptly increases to $n_2$ which corresponds to the second refractive index of the second region. Continuing to move across the transverse plane of the layer, the second refractive index $n_2$ is observed until reaching $d_2$ where the refractive index of the layer abruptly decreases to $n_□$ indicating a second first region.

The change in refractive index between two adjacent first and second regions having low and high indices, respectively, can vary in a number of ways. For example, the change in refractive index can be abrupt, as in a step function, between two adjacent regions. For another example, the change in refractive index can be monotonic, with the refractive index continuously increasing or decreasing (depending on whether the change is observed as a function of moving from the first region to the second region, or the second region to the first region, respectively). In some cases, the first and second refractive indices of the adjacent first and second regions vary as some combination of step and monotonic functions.

The first region of the variable light extraction layer has a refractive index less than that of the second region. For example, the first refractive index may be less than about 1.4, less than about 1.3 or less than about 1.2. The first refractive index may be from about 1.15 to about 1.45, from about 1.2 to about 1.42, from about 1.2 to about 1.40 or from about 1.2 to about 1.35. In general, the particular first and second refractive indices, as well as the particular difference between the two, depends on the desired optical performance of the variable index light extraction layer as described below. The difference in refractive index between the first and second regions is greater than about 0.03. In some embodiments, the difference in refractive index between the first and second regions is greater than 0.05, greater than 0.1, greater than 0.2 or greater than 0.25.

The nanovoided polymeric material typically comprises a plurality of interconnected nanovoids or a network of nanovoids dispersed in a binder. At least some of the nanovoids in the plurality or network are connected to one another via hollow tunnels or hollow tunnel-like passages. The nanovoids are not necessarily free of all matter and/or particulates. For example, in some cases, a nanovoid may include one or more small fiber- or string-like objects that include, for example, a binder and/or nano-particles. Some disclosed first regions include multiple pluralities of interconnected nanovoids or multiple networks of nanovoids where the nanovoids in each plurality or network are interconnected. In some cases, in addition to multiple pluralities of interconnected nanovoids, the disclosed first regions may include a fraction of closed or unconnected nanovoids meaning that the nanovoids are not connected to other nanovoids via tunnels.

The nanovoided polymeric material is designed to support TIR by virtue of including a plurality of nanovoids. When light that travels in an optically transparent (clear and non-porous) adjacent layer and that light is incident on a stratum possessing high porosity, the reflectivity of the incident light is much higher at oblique angles than at normal incidence. In the case of nanovoided first regions having little to no haze, the reflectivity at oblique angles greater than the critical angle is close to about 100%. In such cases, the incident light undergoes TIR.

The nanovoids in the disclosed first region have an index of refraction $n_v$ and a permittivity $□_v$, where $n_v^2=□_v$, and the binder has an index of refraction $n_b$ and a permittivity $□_b$, where $n_b^2=□_b$. In general, the interaction of a layer of nanovoided polymeric material with light, such as light that is incident on, or propagates in, the layer, depends on a number of characteristics of the layer such as, for example, the layer thickness, the binder index, the nanovoid or pore index, the pore shape and size, the spatial distribution of the pores, and the wavelength of light. In some cases, light that is incident on or propagates within the layer of nanovoided polymeric material "sees" or "experiences" an effective permittivity $\varepsilon_{eff}$ and an effective index $n_{eff}$, where $n_{eff}$ can be expressed in terms of the nanovoid index $n_v$, the binder index $n_b$, and the nanovoid porosity or volume fraction "f". In such cases, the layer is sufficiently thick and the nanovoids are sufficiently small so that light cannot resolve the shape and features of a single or isolated nanovoid. In such cases, the size of at least a majority of the nanovoids, such as at least 60% or 70% or 80% or 90% of the nanovoids, is not greater than about $\lambda/5$, or not greater than about $\lambda/6$, or not greater than about $\lambda/8$, or not greater than about $\lambda/10$, or not greater than about $\lambda/20$, where $\lambda$ is the wavelength of light.

In some embodiments, light that is incident on a disclosed first region of the variable light extraction layer is visible light which can be in a range of from about 380 nm to about 750 nm, or from about 400 nm to about 700 nm, or from about 420 nm to about 680 nm. In such cases, the first region of the variable light extraction layer has an effective index of refraction and includes a plurality of nanovoids if the size of at least a majority of the nanovoids, such as at least 60% or 70% or 80% or 90% of the nanovoids, is not greater than about 70 nm, or not greater than about 60 nm, or not greater than about 50 nm, or not greater than about 40 nm, or not greater than about 30 nm, or not greater than about 20 nm, or not greater than about 10 nm.

In some cases, the disclosed first region of the variable index light extraction layer is sufficiently thick so that the region can reasonably have an effective index that can be expressed in terms of the indices of refraction of the nanovoids and the binder, and the nanovoid or pore volume fraction or porosity. In such cases, the thickness of the first region is not less than about 100 nm, or not less than about 200 nm, or not less than about 500 nm, or not less than about 700 nm, or not less than about 1,000 nm.

When the nanovoids in a disclosed first region are sufficiently small and the region is sufficiently thick, the first region has an effective permittivity $\varepsilon_{eff}$ that can be expressed as:

$$\varepsilon_{eff} = f\varepsilon_v + (1-f)\varepsilon_b \quad (1)$$

In such cases, the effective index $n_{eff}$ of the first region can be expressed as:

$$n_{eff}^2 = f n_v^2 + (1-f) n_b^2 \quad (2)$$

In some cases, such as when the difference between the indices of refraction of the pores and the binder is sufficiently small, the effective index of the first region can be approximated by the following expression:

$$n_{eff} = f n_v + (1-f) n_b \quad (3)$$

In such cases, the effective index of the first region is the volume weighted average of the indices of refraction of the nanovoids and the binder. For example, a first region that has a void volume fraction of about 50% and a binder that has an index of refraction of about 1.5, has an effective index of about 1.25.

Figure 3:
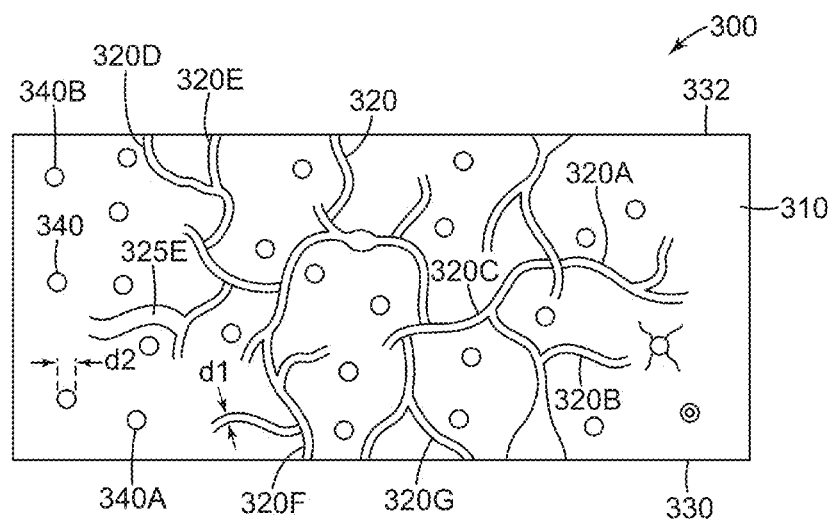
FIG. 3 is a schematic cross-sectional view of a first region of the variable index light extraction layer.

FIG. 3 is a schematic cross-sectional view of a first region of the variable index light extraction layer that includes a network of nanovoids or plurality of interconnected nanovoids and a plurality of particles dispersed substantially uniformly within a binder. First region 300 comprises plurality of interconnected nanovoids 320 dispersed in binder 310. Nanovoids 320 includes interconnected nanovoids 320A-320C. First and second major surfaces 330 and 332, respectively, are porous as indicated by surface pores 320D-G which may or may not provide a tunnel that extends from one surface to another or through the thickness of the region. Some of the nanovoids, such as nanovoids 320B and 320C, are within the interior of the first region and may or may not tunnel to a surface.

Voids 320 have a size $d_1$ that can generally be controlled by choosing suitable composition and fabrication, such as coating, drying and curing conditions. In general, $d_1$ can be any desired value in any desired range of values. For example, in some cases, at least a majority of the nanovoids, such as at least 60% or 70% or 80% or 90% or 95% of the nanovoids, have a size that is in a desired range. For example, in some cases, at least a majority of the nanovoids, such as at least 60% or 70% or 80% or 90% or 95% of the nanovoids, have a size that is not greater than about 500 nm, not greater than about 400 nm, not greater than about 300 nm, not greater than about 200 nm, not greater than about 100 nm, not greater than about 70 nm, or not greater than about 50 nm. In some cases, some of the nanovoids can be sufficiently small such that the refractive index of the region is changed, with little or no scattering of light.

Binder 310 can comprise any material such as a polymer. The binder may be a polymer formed from a polymerizable composition comprising monomers, wherein the monomers are cured using actinic radiation, e.g., visible light, ultraviolet radiation, electron beam radiation, heat and combinations thereof, or any of a variety of conventional anionic, cationic, free radical or other polymerization techniques, which can be chemically or thermally initiated. Polymerization may be carried out using solvent polymerization, emulsion polymerization, suspension polymerization, bulk polymerization, and the like. Useful monomers include small molecules having a molecular weight less than about 500 g/mole, oligomers having a molecular weight of greater than 500 to about 10,000 g/mole, and polymers having a molecular weight of greater than 10,000 to about 100,000 g/mole.

Representative examples of curable groups suitable in the practice of the present disclosure include epoxy groups, ethylenically unsaturated groups, olefinic carbon-carbon double bonds, allyloxy groups, (meth)acrylate groups, (meth)acrylamide groups, cyanoester groups, vinyl ethers groups, combinations of these, and the like. The monomers may be mono- or multifunctional and capable of forming a crosslinked network upon polymerization. As used herein, (meth)acrylate refers to acrylate and methacrylate, and (meth)acrylamide refers to acrylamide and methacrylamide.

Useful monomers include styrene, alpha-methylstyrene, substituted styrene, vinyl esters, vinyl ethers, N-vinyl-2-pyrrolidone, (meth)acrylamide, N-substituted (meth)acrylamide, octyl (meth)acrylate, iso-octyl (meth)acrylate, nonylphenol ethoxylate (meth)acrylate, isononyl (meth)acrylate, diethylene glycol (meth)acrylate, isobornyl (meth)acrylate, 2-(2-ethoxyethoxy)ethyl (meth)acrylate, 2-ethylhexyl (meth)acrylate, lauryl (meth)acrylate, butanediol mono(meth)acrylate, beta-carboxyethyl (meth)acrylate, isobutyl (meth)acrylate, cycloaliphatic epoxide, alpha-epoxide, 2-hydroxyethyl (meth)acrylate, (meth)acrylonitrile, maleic anhydride, itaconic acid, isodecyl (meth) acrylate, dodecyl (meth)acrylate, n-butyl (meth)acrylate, methyl (meth) acrylate, hexyl (meth)acrylate, (meth)acrylic acid, N-vinylcaprolactam, stearyl (meth)acrylate, hydroxyl functional polycaprolactone ester (meth) acrylate, hydroxyethyl (meth)acrylate, hydroxymethyl (meth)acrylate, hydroxypropyl (meth)acrylate, hydroxyisopropyl (meth)acrylate, hydroxybutyl (meth)acrylate, hydroxyisobutyl (meth)acrylate, tetrahydrofurfuryl (meth)acrylate, combinations of these, and the like.

Functional oligomers and polymers may also be collectively referred to herein as "higher molecular weight constituents or species." Suitable higher molecular weight constituents may be incorporated into compositions of the present disclosure. Such higher molecular weight constituents may provide benefits including viscosity control, reduced shrinkage upon curing, durability, flexibility, adhesion to porous and nonporous substrates, outdoor weatherability, and/or the like. The amount of oligomers and/or polymers incorporated into fluid compositions of the present disclosure may vary within a wide range depending upon such factors as the intended use of the resultant composition, the nature of the reactive diluent, the nature and weight average molecular weight of the oligomers and/or polymers, and the like. The oligomers and/or polymers themselves may be straight-chained, branched, and/or cyclic. Branched oligomers and/or polymers tend to have lower viscosity than straight-chain counterparts of comparable molecular weight.

Exemplary polymerizable oligomers or polymers include aliphatic polyurethanes, acrylics, polyesters, polyimides, polyamides, epoxy polymers, polystyrene (including copolymers of styrene) and substituted styrenes, silicone containing polymers, fluorinated polymers, combinations of these, and the like. For some applications, polyurethane and acrylate oligomers and/or polymers can have improved durability and weatherability characteristics. Such materials also tend to be readily soluble in reactive diluents formed from radiation curable, (meth)acrylate functional monomers.

Because aromatic constituents of oligomers and/or polymers generally tend to have poor weatherability and/or poor resistance to sunlight, aromatic constituents can be limited to less than 5 weight percent, preferably less than 1 weight percent, and can be substantially excluded from the oligomers and/or polymers and the reactive diluents of the present disclosure. Accordingly, straight-chained, branched and/or cyclic aliphatic and/or heterocyclic ingredients are preferred for forming oligomers and/or polymers to be used in outdoor applications.

Suitable radiation curable oligomers and/or polymers for use in the present disclosure include, but are not limited to, (meth)acrylated urethanes (i.e., urethane (meth)acrylates), (meth)acrylated epoxies (i.e., epoxy (meth)acrylates), (meth)acrylated polyesters (i.e., polyester (meth)acrylates), (meth)acrylated (meth)acrylics, (meth)acrylated silicones, (meth)acrylated polyethers (i.e., polyether (meth)acrylates), vinyl (meth)acrylates, and (meth)acrylated oils.

Materials useful for toughening the nanovoided layer 300 include resins with high tensile strength and high elongation, for example, CN9893, CN902, CN9001, CN961, and CN964 that are commercially available from Sartomer Company; and EBECRYL 4833 and Eb8804 that are commercially available Cytec. Suitable toughening materials also include combinations of "hard" oligomeric acrylates and "soft" oligomeric acrylates. Examples of "hard" acrylates include polyurethane acrylates such as EBECRYL 4866, polyester acrylates such as EBECRYL 838, and epoxy acrylates such as EBECRYL 600, EBECRYL 3200, and EBECRYL 1608 (commercially available from Cytec); and CN2920, CN2261, and CN9013 (commercially available from Sartomer Company). Examples of the "soft" acrylates include EBECRYL 8411 that is commercially available from Cytec; and CN959, CN9782, and CN973 that are commercially available from Sartomer Company. These materials are effective at toughening the nanovoided structured layer when added to the coating formulation in the range of 5-25% by weight of total solids (excluding the solvent fraction).

The nanovoided polymeric material may or may not contain particles. Particles 340 have a size $d_2$ that can be any desired value in any desired range of values. For example, in some cases at least a majority of the particles, such as at least 60% or 70% or 80% or 90% or 95% of the particles, have a size that is in a desired range. For example, in some cases, at least a majority of the particles, such as at least 60% or 70% or 80% or 90% or 95% of the particles, have a size that is not greater than about 5 um, or not greater than about 3 um, or not greater than about 2 um, or not greater than about 1 micron, or not greater than about 700 nm, or not greater than about 500 nm, or not greater than about 200 nm, or not greater than about 100 nm, or not greater than about 50 nm.

In some cases, particles 340 have an average particle size that is not greater than about 5 um, not greater than about 3 um, not greater than about 2 um, not greater than about 1 um, not greater than about 700 nm, not greater than about 500 nm, not greater than about 200 nm, not greater than about 100 nm, or not greater than about 50 nm. In some cases, some of the particles can be sufficiently small such that the refractive index of the region is changed, with little or no scattering of light.

In some cases, $d_1$ and/or $d_2$ are sufficiently small such that the refractive index of the region is changed, with little or no scattering of light. In such cases, for example, $d_1$ and/or $d_2$ are not greater than about $\square/5$, not greater than about $\square/6$, not greater than about $\square/8$, not greater than about $\square/10$, not greater than about $\square/20$, where $\square$ is the wavelength of light. As another example, in such cases, $d_1$ and $d_2$ are not greater than about 70 nm, not greater than about 60 nm, not greater than about 50 nm, not greater than about 40 nm, not greater than about 30 nm, not greater than about 20 nm, or not greater than about 10 nm.

Other properties of particles used in the nanovoided polymeric layer include shape. The particles can have a regular shape such as spherical, or an irregular shape. The particles can be elongated having an average aspect ratio that is not less than about 1.5, not less than about 2, not less than about 3, not less than about 4, or not less than about 5. In some cases, the particles can be in the form or shape of a string-of-pearls (such as SNOWTEX-PS particles available from Nissan Chemical) or aggregated chains of spherical or amorphous particles, such as fumed silica.

The nanoparticles can be inorganic or organic, or a combination thereof. In some embodiments, the nanoparticles can be porous particles, hollow particles, solid particles, or a combination thereof. Examples of suitable inorganic nanoparticles include silica and metal oxides such as zirconia, titania, ceria, alumina, iron oxide, vanadia, antimony oxide, tin oxide, alumina/silica, silica/zirconia and combinations thereof. The nanoparticles can be surface-modified such that they bond to the binder chemically and/or physically. In the former case, the surface-modified nanoparticles have functionality that chemically reacts with the binder. In general, surface modification is well known and can be carried out with conventional materials and techniques as described in the references cited above.

The weight ratio of binder to nanoparticles can range from about 30:70, 40:60, 50:50, 55:45, 60:40, 70:30, 80:20 or 90:10 or more depending on the desired properties of the nanovoided polymeric layer. The preferred ranges of wt % of nanoparticles range from about 10% by weight to about 60% by weight, and can depend on the density and size of the nanoparticle used.

In cases where the primary optical effect of network of voids 320 and particles 340 is to affect the effective index and to minimize scattered light, the optical haze of optical layer 300 that is due to voids 320 and particles 340 is not greater than about 5%, or not greater than about 4%, or not greater than about 3.5%, or not greater than about 4%, or not greater than about 3%, or not greater than about 2.5%, or not greater than about 2%, or not greater than about 1.5%, or not greater than about 1%. In such cases, the effective index of the effective medium of the optical layer is not greater than about 1.40, or not greater than about 1.35, or not greater than about 1.3, or not greater than about 1.25, or not greater than about 1.2, or not greater than about 1.15.

First region 300 can have other materials in addition to binder 310 and particles 340. For example, first region 300 can include one or more additives, such as for example, coupling agents, to help wet the surface of a substrate, not expressly shown in FIG. 3, on which the nanovoided polymeric material is formed. Other exemplary materials in first region 300 include initiators, such as one or more photo-initiators, anti-stats, UV absorbers and release agents.

The nanovoided polymeric material is typically formed as a layer. Methods for making a layer of the nanovoided polymeric material are described in the Kolb et al. references cited above. In one process, first a solution is prepared that includes a plurality of particles, such as nano-particles, and a polymerizable material dissolved in a solvent, where the polymerizable material can include, for example, one or more types of monomers. Next, the polymerizable material is polymerized, for example by applying heat or light, to form an insoluble polymer matrix in the solvent. In some cases, after the polymerization step, the solvent may still include some of the polymerizable material, although at a lower concentration. Next, the solvent is removed by drying or evaporating the solution resulting in first region 300 that includes a network, or a plurality, of voids 320 dispersed in polymer binder 310. The first region further includes plurality of particles 340 dispersed in the polymer. The particles are bound to the binder, where the bonding can be physical or chemical.

In general, a nanovoided polymeric layer can be formed with a desired porosity or void volume, which can depend on the desired properties of the first region of the variable index light extraction layer. For example, the first region may have a void volume of about 20 to about 70%, about 30 to about 70% or about 40 to about 70%. In some cases, the void volume is not less than about 20%, not less than about 30%, not less than about 40%, not less than about 50%, not less than about 60%, not less than about 70%, not less than about 80%, or not less than about 90%.

In some embodiments, first region 300 has a low optical haze. In such cases, the optical haze of the optical layer is not greater than about 10%. Or not greater than about 7%, or not greater than about 5%, or not greater than about 4%, or not greater than about 3.5%, or not greater than about 4%, or not greater than about 3%, or not greater than about 2.5%, or not greater than about 2%, or not greater than about 1.5%, or not greater than about 1%. The haze variation across the first region can be in the range of from about 1-5%, of from about 1-3%, of from about 1-2%, or less than 1%. In such cases, the optical film can have a reduced effective index that is not greater than about 1.40, or not greater than about 1.35, or not greater than about 1.3, or not greater than about 1.2, or not greater than about 1.15, or not greater than about 1.1, or not greater than about 1.05. For light normally incident on optical layer 300, optical haze, as used herein, is defined as the ratio of the transmitted light that deviates from the normal direction by more than 4 degrees to the total transmitted light. Haze values disclosed herein were measured using a Haze-Gard Plus haze meter (BYK-Gardiner, Silver Springs, Md.) according to the procedure described in ASTM D1003.

In some embodiments, first region 300 has a high optical clarity. For light normally incident on first region 300, optical clarity, as used herein, refers to the ratio $(T_1-T_2)/(T_1+T_2)$, where $T_1$ is the transmitted light that deviates from the normal direction between 1.6 and 2 degrees, and $T_2$ is the transmitted light that lies between zero and 0.7 degrees from the normal direction. Clarity values disclosed herein were measured using a Haze-Gard Plus haze meter from BYK-Gardiner. In the cases where first region 300 has a high optical clarity, the clarity is not less than about 80%, or not less than about 85%, or not less than about 90%, or not less than about 95%.

The nanovoided polymeric material of the first region 300, can be made by coating the solvent containing solution described above onto a substrate. In many cases the substrate can be formed of any polymeric material useful in a roll to roll process. In some embodiments the substrate layer is transparent with little to no haze and high clarity and is formed of polymers such as polyethylene terephthalate (PET), polycarbonates, acrylics, and cycloolefin polymers. The substrate may also comprise transparent substrates such as glass and other transparent inorganic materials. The substrate may also comprise reflective scattering substrates or materials such as diffuse white polymeric substrates, semispecular substrates polymeric substrates such as multilayer optical films (for example ESR available from 3M), metallic semispecular reflectors for example brushed aluminum. In some cases the substrate may comprise a release liner such that the nanovoided polymeric layer 300 may be transferred to another substrate for example to an adhesive layer.

For embodiments in which the first region comprises nanovoided polymeric material, the additional material defines the second region. The additional material resides within the nanovoids of the nanovoided polymeric material and has a refractive index high enough such that the refractive index of the second region is greater than that of the first region. Useful additional materials include any material that can be incorporated within the nanovoided polymeric material such that the variable index light extraction layer can function as desired. The additional material has a high refractive index in the sense that it can increase the refractive index of the nanovoided polymeric material, i.e., can increase the first refractive index by at least about 0.03, for example, from about 0.03 to about 0.5, from about 0.05 to about 0.5, or from about 0.05 to about 0.25.

In general, the additional material can have a refractive index in a range of from about 1.40 to 2.1. The exact range of refractive indices for the additional material will depend on the refractive index the nanovoided polymeric material and also the refractive index of an adjacent layer from which the extraction layer is extracting light. For the purposes of the invention described herein, the variable index light extraction layer is designed to extract light from an adjacent transparent layer. In order to perform this function the first region of the variable index light extraction layer must have a refractive index less than that of the adjacent transparent layer, and the second region of the variable index light extraction layer has a refractive index approximately equal to or greater than that of the adjacent transparent layer from which the light is being extracted.

In general, the additional material is incorporated into the nanovoided polymeric material with little or no additional material on a surface of the nanovoided polymeric material. In some embodiments, the additional material substantially completely fills the interconnected nanovoids such that little or no void volume (less than 5% void volume) remains within the second region. In some embodiments, the additional material partially fills the interconnected nanovoids such that some void volume remains. The second regions comprise a particular amount of void volume depending upon the refractive index of the additional material and the desired difference in refractive indices between the first and second regions. For example, the second region may have a void volume less than about 20%, less than about 10%, less than about 5% or less than about 1%.

Exemplary additional materials include small molecules, oligomers and polymers. Any of the materials described above for making the nanovoided polymeric material may be used as the additional material. Generally, the additional material is deposited into voids of the nanovoided polymeric material, using methods such as printing which are described below. In some cases, the additional material is a polymerizable material that is 100% solids and has a viscosity that under the conditions of application allows the additional material to penetrate the nanovoided polymeric material thus forming the second region.

The particular choice of additional material may depend on the method by which it is incorporated into the nanovoided polymeric layer. Various methods are described below. For example, in some embodiments, the variable index light extraction layer is made by depositing the additional material on selected areas or regions of a surface of a layer comprising the nanovoided polymeric material. The additional material then penetrates the nanovoided polymeric material such that little or no additional material remains on a surface of the layer. This embodiment may require an additional material having a low enough viscosity and molecular constituents with sizes that are small enough to penetrate into and through the nanovoids of the nanovoided polymeric material.

In some embodiments, the variable index light extraction layer is made by depositing a polymerizable composition on selected areas or regions of a surface of a layer comprising the nanovoided polymeric material. The polymerizable composition then penetrates the nanovoided material such that little or no polymerizable composition remains on a surface of the layer. The polymerizable composition can then be polymerized by conventional means to form the additional material, thus forming the second region having both the first material and the additional material. In some cases the additional material penetrates completely through the thickness of the layer of the nanovoided polymeric material.

The first and second regions may be disposed relative to each other, across a transverse plane of the variable index light extraction layer, in order to manage light in a desired way. For example, the second region may comprise a plurality of second regions arranged in a pattern across a transverse plane of the layer. For another example, the second region may comprise a plurality of second regions arranged randomly across a transverse plane of the layer. Either the first or second region may be a continuous region across a transverse plane of the layer. For a first or second region that is discontinuous, i.e., is a plurality of regions, the density can vary in any direction across a transverse plane of the layer. For example, the density of second regions can vary in one or two dimensions across a transverse plane of the layer. Several of these embodiments are described in FIGS. 4a-4d, 5a and 5b.

The optimal thickness of the variable index light extraction layer is determined by the function that the layer is designed to perform. The layer thickness depends on the nature of the nanovoided polymeric material. The variable index light extraction layer should be thick enough such that the first region can provide optical isolation of an adjacent transparent substrate, in which supercritical light is propagating, from another layer which is disposed on an opposing side of the variable index light extraction layer. The thickness of the nanovoided polymeric layer should be thin enough such that the additional material can be deposited onto the layer and penetrate substantially into the layer, and in some cases through the thickness of the layer, thus creating the second region. In some cases the variable index light extraction layer has a thickness greater than about 500 nm, or in the range of from about 500 nm to about 100 um, from about 500 nm to about 8 um, from about 1 micron to about 5 um, or from about 1 um to about 3 um.

The variable index light extraction layer supports or promotes TIR, and so the layer is sufficiently thick so that the evanescent tail of a light ray that undergoes TIR at a surface of the variable index light extraction layer does not optically couple, or optically couples very little, across the thickness of the layer. In such cases, the thickness of the variable index light extraction layer is not less than about 0.5 um, not less than about 1 um, not less than about 1.1 um, not less than about 1.2 um, not less than about 1.3 um, not less than about 1.4 um, not less than about 1.5 um, not less than about 1.7 um, or not less than about 2 um. A sufficiently thick variable index light extraction layer can prevent or reduce an undesired optical coupling of the evanescent tail of an optical mode across the thickness of the layer.

In some cases, the variable index light extraction layer has low optical haze measured as a bulk property of the layer. In such cases, the optical haze of the variable index light extraction layer is not greater than about 10%, not greater than about 7%, not greater than about 5%, not greater than about 4%, not greater than about 3.5%, not greater than about 4%, not greater than about 3%, not greater than about 2.5%, not greater than about 2%, not greater than about 1.5%, or not greater than about 1%. In such cases, the variable index light extraction layer can have a reduced effective index that is not greater than about 1.40, not greater than about 1.35, not greater than about 1.3, not greater than about 1.2, not greater than about 1.15, not greater than about 1.1, or not greater than about 1.05. Optical haze, as used herein, is defined for normally incident light on the surface of a given layer, as the ratio of the transmitted light that deviates from the normal direction by more than 4 degrees to the total transmitted light. Haze values disclosed herein were measured using a Haze-Gard Plus haze meter (BYK-Gardiner, Silver Springs, Md.) according to the procedure described in ASTM D1003.

In some cases, the variable index light extraction layer has high optical clarity. Optical clarity, as used herein, is defined for light normally incident on the layer and refers to the ratio $(T_1-T_2)/(T_1+T_2)$, where $T_1$ is the transmitted light that deviates from the normal direction between 1.6 and 2 degrees, and $T_2$ is the transmitted light that lies between zero and 0.7 degrees from the normal direction. Clarity values disclosed herein were measured using a Haze-Gard Plus haze meter from BYK-Gardiner. In cases where variable index light extraction layer has high optical clarity, the clarity is not less than about 80%, not less than about 85%, not less than about 90%, or not less than about 95%.

Figure 4A:
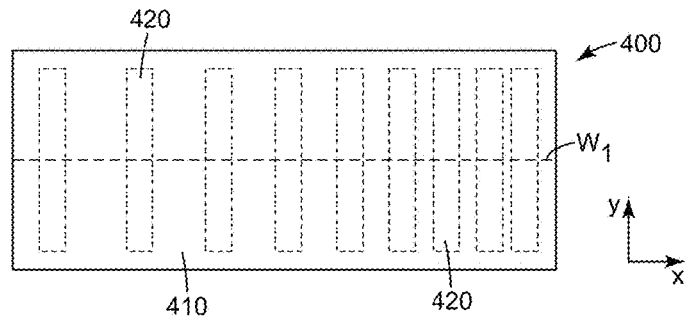
FIG. 4a is a plan view of a variable index light extraction layer showing an exemplary geometric arrangement of the first and second regions.

The variable index light extraction layer can comprise the first and second regions disposed relative to each other, in some desired geometric arrangement across a transverse plane of the layer, so that the layer provides desired optical performance features. FIG. 4a is a plan view of a variable index light extraction layer showing an exemplary geometric arrangement of the first and second regions. Variable index light extraction layer 400 comprises first region 410 that is continuous across the layer as seen in plan view of the layer, and second regions 420 are discreet regions enclosed by the rectangles illustrated using dashed lines.

As stated above, dashed lines are used throughout this disclosure to indicate general location of the first and second regions, however, these dashed lines are not meant to describe any sort of boundary between the regions. As described herein, the second regions are formed by depositing additional material on nanovoided polymeric material, typically by some printing means, such that the penetration, wicking, etc. of the additional material into the nanovoided polymeric material is dependent on the chemistry of the materials used to form the regions as well as properties such as viscosity, wetting, temperature and so forth.

Figure 4B:
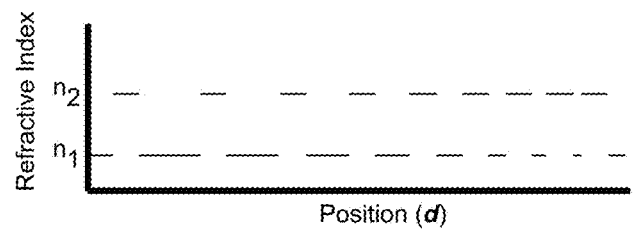
Figure 4C:
Figure 4D:
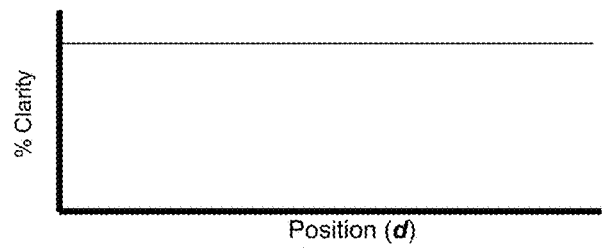

Second regions 420 are shaped as rectangles or stripes of substantially the same length and width, extending across the width of layer 400, and disposed from left to right with increasing frequency. Second regions 420 have a refractive index greater than that of first region 410 by at least about 0.03. FIG. 4b illustrates the refractive index profile for variable index light extraction layer 400 with the x-axis identifying positions d down the length of the layer at some substantially single position $w_1$ as shown in FIG. 4a. The refractive index profile shows the variation in the refractive index of layer 400 which comprises a pattern between first and second refractive indices, $n_1$ and $n_2$, respectively. FIGS. 4c and 4d show profiles for selected optical properties % transmission and % clarity, respectively, and for both properties, there is substantially little or no variation down the length of the layer.

Figure 5A:
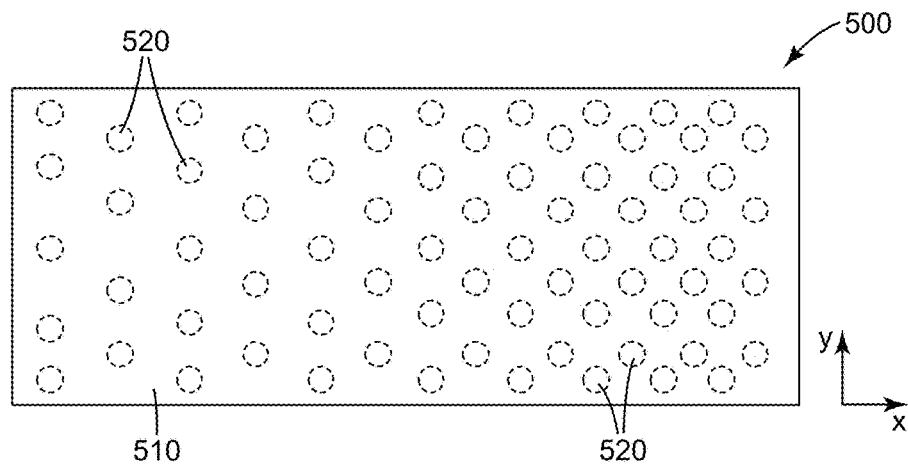
FIGS. 5a-5b show plan views of variable index light extraction layers showing exemplary geometric arrangements of the first and second regions.

FIG. 5a shows a plan view of another variable index light extraction layer showing an exemplary geometric arrangement of the first and second regions. Variable index light extraction layer 500 comprises first region 510 that is continuous across the layer as seen in plan view of the layer, and second regions 520 are discreet regions enclosed by the circles illustrated using dashed lines. The pattern also shows that the density of the second regions 520 can vary in both the x and y dimensions.

Figure 5B:
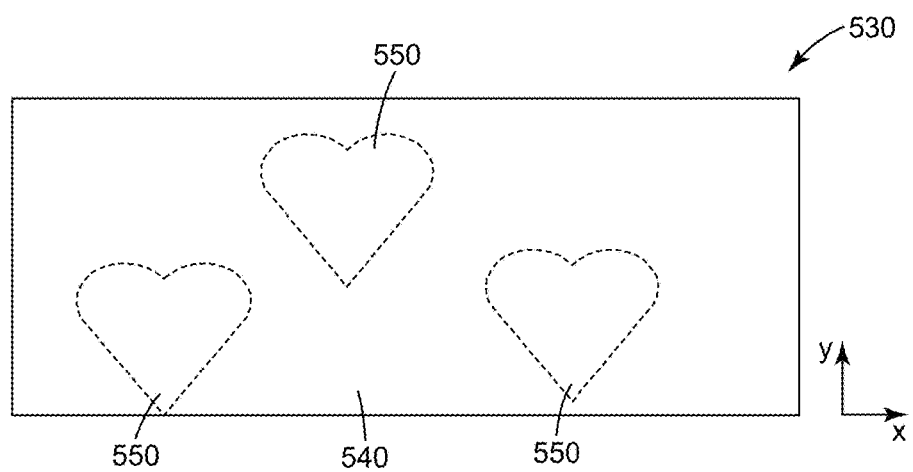

FIG. 5b shows a plan view of another variable index light extraction layer showing an exemplary geometric arrangement of the first and second regions. Variable index light extraction layer 530 comprises first region 540 that is continuous across the layer as seen in plan view of the layer, and second regions 550 are discreet regions enclosed by the shapes, in this case hearts, as illustrated using dashed lines. The pattern shows that the geometric arrangement of high index regions, do not have to vary in a gradient fashion, but that they may also be patterned to provide image-wise extraction of supercritical light from an adjacent transparent layer.

The geometric arrangement of the first and second regions of the variable light extraction layer is designed to extract supercritical light propagating in an adjacent transparent layer and deliver that light to another layer on the opposing side of the variable index light extraction layer in a predetermined pattern, for example substantially uniform illumination.

In some embodiments, the ratio of the size of the second high index region relative to the thickness of the variable index light extraction layer is important to the function of an illumination assembly comprising the variable index extraction layer. The aspect ratio of an illumination assembly is defined as the thickness of the variable index light extraction layer divided by the smallest width of the second regions. In some embodiments, this aspect ratio is less than about 1/3, less than about 1/5, or less than about 1/10. In some embodiments, the smallest width of the second high index region is in the range of 10 microns to 200 microns, and the thickness of the variable index light extraction layer is in the range of 500 nm to 8 microns, while satisfying the constraint that the aspect ratio is less than about 1/3.

The variable index light extraction layer may be disposed on a substrate. The substrate may comprise a support used to manufacture the layer as described in PCT Application No. US2011/021053 (Wolk et al.). In some embodiments, an optical film includes the variable index light extraction layer disposed on a transparent substrate. As used herein, "transparent" means substantially optically clear and substantially low haze and non-scattering. Exemplary transparent substrates have requisite optical properties depending on desired properties of the optical film. The transparent substrate may comprise a polymeric substrate such as a polyester, poly(meth)acrylate, polycarbonate and the like. In some embodiments, the transparent substrate comprises a lightguide as described below. In some embodiments, the transparent substrate has some level of haze and can provide some light scattering such that light can be scattered in a forward direction toward a display or graphic layer which is being backlit.

Figure 6:
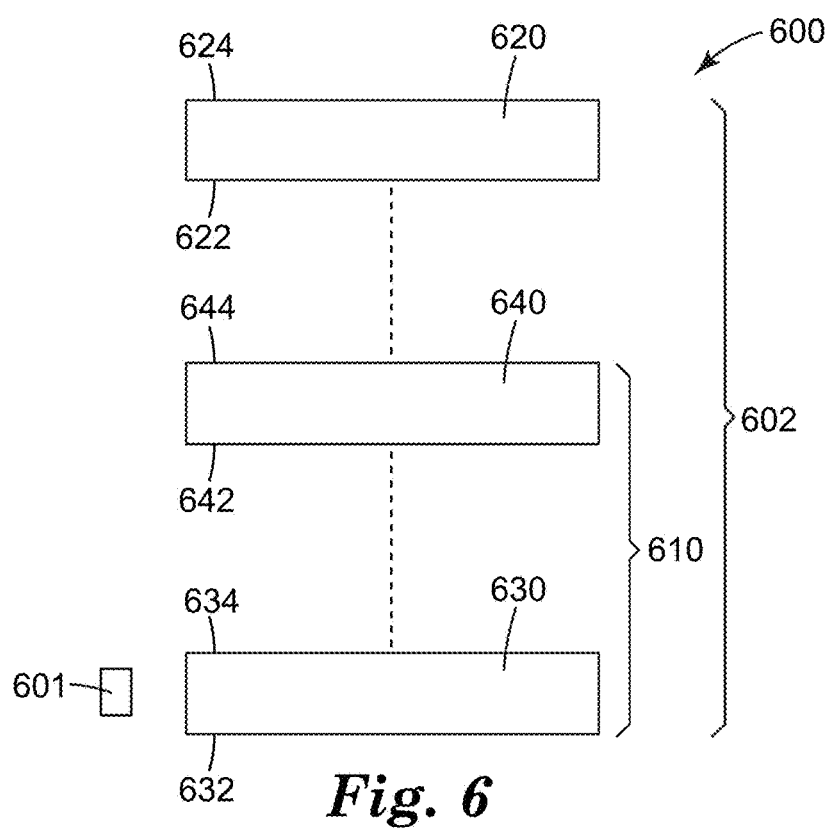
FIGS. 6 and 7a-7b show schematic cross sections of exemplary back-lit transmissive display devices comprising the variable index light extraction layer in combination with a light source and a transmissive display.

FIG. 6 shows a schematic of exemplary back-lit transmissive display device 600 comprising light source 601 and back-lit transmissive display assembly 602. Back-lit transmissive display assembly 602 comprises illumination article 610 and transmissive display 620. Illumination article 610 comprises lightguide 630 disposed adjacent to variable light extraction layer 640. The lightguide is optically coupled to the bottom surface 642 of variable index light extraction layer 640 (denoted by the dashed line between the two surfaces). Adjacent opposing surface 644 of the variable index light extraction layer is optically coupled to transmissive display 620 (denoted by the dashed line between the two surfaces). Light source 601 is optically coupled to lightguide 630 such that light emitted by the light source can enter the lightguide.

In some embodiments, there are no air gaps between bottom surface 632 of lightguide 630 and top surface 644 of variable index light extraction layer 640, and there are no air gaps between the bottom surface 642 of the variable index light extraction layer 640 and top surface 624 of the transmissive display 620 in order for optical coupling to occur. In general, as used herein, an air gap is defined as a continuous layer, space, etc. which exists substantially, uniformly and continuously between major surfaces of two adjacent layers, substrates, etc. Bottom surface 632 of lightguide 630 promotes TIR of light propagating within the lightguide.

In some embodiments, lightguide 630 has a refractive index between those of the first and second regions of the variable index light extraction layer 640.

According to this embodiment, a method of providing light comprises: providing a light source, lightguide and variable index light extraction layer; and optically coupling the light source to the lightguide, and the lightguide to the variable index light extraction layer, such that light emitted by the light source is transported within the lightguide by total internal reflection and selectively extracted from the lightguide by the variable index light extraction layer.

In some embodiments, variable index light extraction layer 640 can be disposed directly on surface 622 of transmissive display 620. Lightguide 630 can be directly attached to surface 642 of the variable index light extraction layer by several methods. As described below, lightguide 630 can comprise a thermoplastic resin material, for example, an acrylic, and in these cases, the lightguide can be formed by either casting molten resin onto surface 642 of the variable index extraction layer, or it can be attached to the variable index light extraction layer by an insert injection molding process. In some cases lightguide 630 comprises an elastomeric material such that it can be heat laminated to surface 642 of the variable index extraction layer. In some cases lightguide 630 comprises a pressure sensitive adhesive (PSA) such that it can be directly laminated to surface 642 of the variable index extraction layer. In cases where lightguide 630 is not an adhesive, surface 642 of the variable index light extraction layer can be adhered to surface 634 of the lightguide using an optically clear adhesive. Optically clear adhesives are described below.

Lightguide 630 may include any suitable material or materials. For example, the lightguide may include glass, acrylates, including polymethylmethacrylate, polycarbonate, polystryrene, styrene methacrylate copolymers and blends, cycloolefin polymers (e.g. ZEONEX and ZEONOR available from ZEON Chemicals L.P., Louisville, Ky.), fluoropolymers, polyesters including polyethylene terephthalate (PET), polyethylene naphthalate (PEN), and copolymers containing PET or PEN or both; polyurethanes, epoxies, polyolefins including polyethylene, polypropylene, polynorbornene, polyolefins in isotactic, atactic, and syndiotactic strereoisomers, and polyolefinss produced by metallocene polymerization. In some cases, the lightguide can be elastomeric such as elastomeric polyurethanes materials and silicone based polymers, including but not limited to, polydialkylsiloxanes, silicone polyureas, and silicone polyoxamides.

In some embodiments, the lightguide is a viscoelastic lightguide as described in WO 2010/005655 A2 (Sherman et al.). In general, the viscoelastic lightguide comprises one or more viscoelastic materials which exhibit both elastic and viscous behavior when undergoing deformation. Elastic characteristics refer to the ability of a material to return to its original shape after a transient load is removed. One measure of elasticity for a material is referred to as the tensile set value which is a function of the elongation remaining after the material has been stretched and subsequently allowed to recover (destretch or contract from the stretched state) under the same conditions by which it was stretched. If a material has a tensile set value of 0%, then it has returned to its original length upon relaxation, whereas if the tensile set value is 100%, then the material is twice its original length upon relaxation. Tensile set values may be measured using ASTM D412. Useful viscoelastic materials may have tensile set values of greater than about 10%, greater than about 30%, or greater than about 50%; or from about 5 to about 70%, from about 10 to about 70%, from about 30 to about 70%, or from about 10 to about 60%.

Viscous materials that are Newtonian liquids have viscous characteristics that obey Newton's law which states that stress increases linearly with shear gradient. A liquid does not recover its shape as the shear gradient is removed. Viscous characteristics of useful viscoelastic materials include flowability of the material under reasonable temperatures such that the material does not decompose.

The viscoelastic lightguide may have properties that facilitate sufficient contact or wetting with at least a portion of a material designed to extract light from the lightguide, e.g., an optical article, such that the viscoelastic lightguide and the optical article are optically coupled. Light can then be extracted from the viscoelastic lightguide. The viscoelastic lightguide is generally soft, compliant and flexible. Thus, the viscoelastic lightguide may have an elastic modulus (or storage modulus G') such that sufficient contact can be obtained, and a viscous modulus (or loss modulus G") such that the layer doesn't flow undesirably, and a damping coefficient (G"/G', tan D) for the relative degree of damping of the layer. Useful viscoelastic materials may have a storage modulus, G', of less than about 300,000 Pa, measured at 10 rad/sec and a temperature of from about 20 to about 22° C. Viscoelastic properties of materials can be measured using Dynamic Mechanical Analysis according to, for example, ASTM D4065, D4440, and D5279.

In some embodiments, the viscoelastic lightguide comprises a PSA layer as described in the Dalquist criterion line (as described in Handbook of Pressure Sensitive Adhesive Technology, Second Ed., D. Satas, ed., Van Nostrand Reinhold, New York, 1989.)

The viscoelastic lightguide may have a particular peel force or at least exhibit a peel force within a particular range. For example, the viscoelastic lightguide may have a 90° peel force of from about 50 to about 3000 g/in, from about 300 to about 3000 Win, or from about 500 to about 3000 g/in. Peel force may be measured using a peel tester from IMASS.

In some embodiments, the viscoelastic lightguide comprises an optically clear lightguide having high light transmittance of from about 80 to about 100%, from about 90 to about 100%, from about 95 to about 100%, or from about 98 to about 100% over at least a portion of the visible light spectrum (about 400 to about 700 nm). In some embodiments, the viscoelastic lightguide has a haze value of less than about 5%, less than about 3%, or less than about 1%. In some embodiments, the viscoelastic lightguide has a haze value of from about 0.01 to less than about 5%, from about 0.01 to less than about 3%, or from about 0.01 to less than about 1%. Haze values in transmission can be determined using a haze meter according to ASTM D1003.

In some embodiments, the viscoelastic lightguide comprises an optically clear lightguide having high light transmittance and a low haze value. High light transmittance may be from about 90 to about 100%, from about 95 to about 100%, or from about 99 to about 100% over at least a portion of the visible light spectrum (about 400 to about 700 nm), and haze values may be from about 0.01 to less than about 5%, from about 0.01 to less than about 3%, or from about 0.01 to less than about 1%. The viscoelastic lightguide may also have a light transmittance of from about 50 to about 100%.

The viscoelastic lightguide may have a refractive index in the range of from about 1.3 to about 2.6, 1.4 to about 1.7, or from about 1.5 to about 1.7. The particular refractive index or range of refractive indices selected for the viscoelastic lightguide may depend on the overall design of the illumination device and the particular application in which the device may be used.

The viscoelastic lightguide material may comprise nanoparticles that can modify the refractive index of the viscoelastic lightguide material or to affect the mechanical properties of the viscoelastic lightguide material. Suitable nanoparticles have sizes such that the particles produce the desired effect without introducing significant amount of scattering into lightguide material.

The viscoelastic lightguide generally comprises at least one polymer. The viscoelastic lightguide may comprise at least one PSA. PSAs are useful for adhering together adherends and exhibit properties such as: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process. A quantitative description of PSAs can be found in the Dahlquist reference cited above.

Useful PSAs are described in detailed in the Sherman et al. references cited above. Useful PSAs include poly(meth) acrylate PSAs derived from: monomer A comprising at least one monoethylenically unsaturated alkyl (meth)acrylate monomer, wherein a homopolymer of the monomer has a Tg of no greater than about 0° C.; and monomer B comprising at least one monoethylenically unsaturated free-radically copolymerizable reinforcing monomer, wherein a homopolymer of the monomer has a Tg higher than that of monomer A, for example, at least about 10° C. As used herein, (meth)acrylic refers to both acrylic and methacrylic species and likewise for (meth)acrylate.

In some embodiments, the viscoelastic lightguide comprises natural rubber-based and synthetic rubber-based PSAs, thermoplastic elastomers, tackified thermoplastic-epoxy derivatives, polyurethane derivatives, polyurethane acrylate derivatives, silicone PSAs such as polydiorganosiloxanes, polydiorganosiloxane polyoxamides and silicone urea block copolymers.

In some embodiments, the viscoelastic lightguide comprises a clear acrylic PSA, for example, those available as transfer tapes such as VHB™ Acrylic Tape 4910F or 4918 from 3M Company and 3M™ Optically Clear Laminating Adhesives (8140 and 8180 series).

In some embodiments, the viscoelastic lightguide comprises a block copolymer dispersed in an adhesive matrix to form a Lewis acid-base pair. In some embodiments, the viscoelastic lightguide comprises a stretch releasable PSA that can be removed from a substrate when stretched at or nearly at a zero degree angle.

As described above, lightguide 630 can be adhered to variable index light extraction layer 640 using an optically clear adhesive (OCA). In some embodiments, the OCA comprises a PSA having high light transmittance of from about 80 to about 100%, from about 90 to about 100%, from about 95 to about 100%, or from about 98 to about 100% over at least a portion of the visible light spectrum (about 400 to about 700 nm), and/or a haze value of from about 0.01 to less than about 5%, from about 0.01 to less than about 3%, or from about 0.01 to less than about 1%.

In some embodiments, useful PSAs include those described in the Dalquist criterion line (as described in Handbook of Pressure Sensitive Adhesive Technology, Second Ed., D. Satas, ed., Van Nostrand Reinhold, New York, 1989.) The PSA may have a particular peel force or at least exhibit a peel force within a particular range. For example, the PSA may have a 90° peel force of from about 10 to about 3000 g/in, from about 300 to about 3000 g/in, or from about 500 to about 3000 g/in. Peel force may be measured using a peel tester from IMASS.

The OCA may have a refractive index in the range of from about 1.3 to about 2.6, 1.4 to about 1.7, or from about 1.5 to about 1.7. The particular refractive index or range of refractive indices selected for the OCA may depend on the overall design of an optical film comprising the lightguide and the variable index light extraction layer. In general the OCA should have a refractive index approximately equal to or greater than that of the lightguide, and between that of the first and second regions of variable index light extraction layer 640.

The PSA used as the OCA may comprise any of the materials described above for the viscoelastic lightguide. Additional exemplary OCAs that are PSAs include tackified thermoplastic epoxies as described in U.S. Pat. No. 7,005,394 (Ylitalo et al.), polyurethanes as described in U.S. Pat. No. 3,718,712 (Tushaus), polyurethane acrylates as described in US 2006/0216523 (Shusuke). In some embodiments, the adhesive comprises a clear acrylic PSA, for example, those available as transfer tapes such as VHB™ Acrylic Tape 4910F and 4918 from 3M Company, 3M™ Optically Clear Laminating Adhesives (8140 and 8180 series) and 3M™ Optically Clear Laminating Adhesives 8171 CL and 8172 CL) described in WO 2004/0202879. Useful OCAs are also described in US 2011/0039099 (Sherman et al.). In some embodiments, the OCA may comprise a PSA having a microstructured adhesive surface to allow for air bleed upon application to the surface of the lightguide as described, for example, in US 2007/0212535 (Sherman et al.).

The adhesive may comprise a stretch releasable PSA. Stretch releasable PSAs are PSAs that can be removed from a substrate if they are stretched at or nearly at a zero degree angle. In some embodiments, the adhesive or a stretch release PSA used as in the optical tape has a shear storage modulus of less than about 10 MPa when measured at 1 rad/sec and −17° C., or from about 0.03 to about 10 MPa when measured at 1 rad/sec and −17° C. Stretch releasable PSAs may be used if disassembling, reworking, or recycling is desired.

In some embodiments, the stretch releasable PSA may comprise a silicone-based PSA as described in U.S. Pat. No. 6,569,521 B1 (Sheridan et al.), U.S. Pat. No. 9,228,117 B1 (Sherman et al.), or U.S. Pat. No. 8,673,419 (Determan et al.). Such silicone-based PSAs include compositions of an MQ tackifying resin and a silicone polymer. For example, the stretch releasable PSA may comprise an MQ tackifying resin and an elastomeric silicone polymer selected from the group consisting of urea-based silicone copolymers, oxamide-based silicone copolymers, amide-based silicone copolymers, urethane-based silicone copolymers, and mixtures thereof.

In some embodiments, the stretch releasable PSA may comprise an acrylate-based PSA as described in WO 2010/078346 (Yamanaka et al.) and WO 2010/077541 (Tran et al.) Such acrylate-based PSAs include compositions of an acrylate, an inorganic particle and a crosslinker. These PSAs can be a single or multilayer.

In some embodiments the adhesive layer may comprise the cured reaction product of a multifunctional ethylenically unsaturated siloxane polymer and one or more vinyl monomers as described in U.S. Pat. No. 7,862,898 (Sherman et al.) and U.S. Pat. No. 7,892,649 (Sherman et al.).

In some embodiments the use of self-wetting adhesives as described in WO 2010/132176 (Sherman et al.) and WO 2009/085662 (Sherman et al.) is beneficial in placement of the illumination device 600 onto a reflective scattering element.

An exemplary PSA comprises a polymer derived from an oligomer and/or monomer comprising polyether segments, wherein from 35 to 85% by weight of the polymer comprises the segments. These adhesives are described in US 2007/0082969 A1 (Malik et al.). Another exemplary PSA comprises the reaction product of a free radically polymerizable urethane-based or urea-based oligomer and a free radically polymerizable segmented siloxane-based copolymer; these adhesives are described in US Pat. App. Pub. No. 2013/0288052 (Tapio et al.).

The PSA can optionally include one or more additives such as nanoparticles, plasticizers, chain transfer agents, initiators, antioxidants, stabilizers, viscosity modifying agents, and antistats.

In some embodiments, a seal layer is disposed on the variable index light extraction layer in order to minimize penetration of contaminants into the latter. For example, when an adhesive layer is used to adhere the lightguide to the variable index light extraction layer, a seal layer may be disposed on the bottom surface 642 of variable index light extraction layer 640 such that it is in between the variable index light extraction layer and the adhesive layer. For another example, a seal layer may be disposed on the variable index light extraction layer such that it is in between the variable index light extraction layer and the lightguide, and the seal layer has a refractive index that is approximately equal to or greater than that of the lightguide.

Suitable seal layers include pressure sensitive adhesive polymers and copolymers which can be acrylic or acrylate based, styrene butadiene, or styrene isoprene type copolymer thermoplastic resins and similar polymers so long as they do not contain a significant fraction of low molecular weight species capable of penetration into the nanovoided first region. Other polymer seal layers can be heat activated adhesive polymers including acrylics, acrylic-vinyl acetate, copolymers, block copolymers, EVA copolymers, polyamides, polyesters, polyethylene polymers and copolymers, polyisobutylene, polypropylene polymers and copolymers, polyurethane polymers and copolymers and other polymers including Surlyn plastic, vinyl acetate, and polyvinylidene fluoride polymers, their alloys, copolymers and derivatives with acid salt groups. These materials can be laminated with a direct film lamination, applied by melt coating or coated from an aqueous or solvent borne emulsion or dispersion of the polymer by any suitable coating method. Two examples of suitable polymeric dispersions useful as seal layers are NEOCRYL A-614 and NEOPAC R-9699 (available from DSM (6401 JH Heerlen, Netherlands).

The light source is optically coupled to the lightguide such that at least some of the light from the light source can enter the lightguide. For example, a light source may be optically coupled to the lightguide such that greater than 1, greater than 10, greater than 20, greater than 30, greater than 40, greater than 50, greater than 90%, or about 100% of light emitted by the light source enters the lightguide. For another example, a light source may be optically coupled to the lightguide such that from about 1 to about 10%, from about 1 to about 20%, from about 1 to about 30%, from about 1 to about 40%, from about 1 to about 50%, from about 1 to about 100%, from about 1 to about 100%, from about 50 to about 100%, or from about 1 to about 100% of light emitted by the light source enters the lightguide. The light source may emit light having a random or a particular angular distribution.

The light source may comprise any suitable light source. Exemplary light sources include linear light sources such as cold cathode fluorescent lamps and point light sources such as light emitting diode (LEDs). Exemplary light sources also include organic light-emitting devices (OLEDs), incandescent bulbs, fluorescent bulbs, halogen lamps, UV bulbs, infrared sources, near-infrared sources, lasers, or chemical light sources. In general, the light emitted by the light source may be visible or invisible. At least one light source may be used. For example, from 1 to about 10,000 light sources may be used. The light source may comprise a row of LEDs positioned at or near an edge of the lightguide. The light source may comprise LEDs arranged on a circuit such that light emitted from the LEDs lights up continuously or uniformly the lightguide throughout a desired area. The light source may comprise LEDs that emit light of different colors such that the colors can mix within the lightguide.

"LED" refers to a diode that emits light, whether visible, ultraviolet, or infrared. It includes incoherent encased or encapsulated semiconductor devices marketed as "LEDs," whether of the conventional or super radiant variety. If the LED emits non-visible light such as ultraviolet light, and in some cases where it emits visible light, it is packaged to include a phosphor (or it may illuminate a remotely disposed phosphor) to convert short wavelength light to longer wavelength visible light, in some cases yielding a device that emits white light.

An "LED die" is an LED in its most basic form, i.e., in the form of an individual component or chip made by semiconductor processing procedures. The component or chip can include electrical contacts suitable for application of power to energize the device. The individual layers and other functional elements of the component or chip are typically formed on the wafer scale, and the finished wafer can then be diced into individual piece parts to yield a multiplicity of LED dies.

Multicolored light sources, whether or not used to create white light, can take many forms in a light assembly, with different effects on color and brightness uniformity of the lightguide output area or surface. In one approach, multiple LED dies (e.g., a red, a green, and a blue light emitting die) are all mounted in close proximity to each other on a lead frame or other substrate, and then encased together in a single encapsulant material to form a single package, which may also include a single lens component. Such a source can be controlled to emit any one of the individual colors or all colors simultaneously. In another approach, individually packaged LEDs, with only one LED die and one emitted color per package, can be clustered together for a given recycling cavity, the cluster containing a combination of packaged LEDs emitting different colors such as blue/yellow, red/green/blue, red/green/blue/white, or red/green/blue/cyan/yellow. Amber LEDs can also be used. In still another approach, such individually packaged multicolored LEDs can be positioned in one or more lines, arrays, or other patterns.

If desired, other visible light emitters such as linear cold cathode fluorescent lamps (CCFLs) or hot cathode fluorescent lamps (HCFLs) can be used instead of or in addition to discrete LED sources as illumination sources for the disclosed backlights. In addition, hybrid systems such as, for example, (CCFL/LED), including cool white and warm white, CCFL/HCFL, such as those that emit different spectra, may be used. The combinations of light emitters may vary widely, and include LEDs and CCFLs, and pluralities such as, for example, multiple CCFLs, multiple CCFLs of different colors, and LEDs and CCFLs. The light sources may also include lasers, laser diodes, plasma light sources, or organic light emitting diodes, either alone or in combination with other types of light sources, e.g., LEDs.

For example, in some applications it may be desirable to replace the row of discrete light sources with a different light source such as a long cylindrical CCFL, or with a linear surface emitting lightguide emitting light along its length and coupled to a remote active component (such as an LED die or halogen bulb), and to do likewise with other rows of sources. Examples of such linear surface emitting lightguides are disclosed in U.S. Pat. No. 5,845,038 (Lundin et al.) and U.S. Pat. No. 6,367,941 (Lea et al.). Fiber-coupled laser diode and other semiconductor emitters are also known, and in those cases the output end of the fiber optic waveguide can be considered to be a light source with respect to its placement in the disclosed recycling cavities or otherwise behind the output area of the backlight. The same is also true of other passive optical components having small emitting areas such as lenses, deflectors, narrow lightguides, and the like that give off light received from an active component such as a bulb or LED die. One example of such a passive component is a molded encapsulant or lens of a side-emitting packaged LED. Any suitable side-emitting LED can be used for one or more light sources, e.g., LUXEON LEDs (available from Lumileds, San Jose, Calif.), or the LEDs described, e.g., in U.S. Pat. No. 7,525,126 (Leatherdale et al.) and US 2007/0257270 (Lu et al.).

Light which enters the lightguide can be collimated such that it is incident on an interface between the lightguide and another medium at angles less than 50 degrees, less that 40 degrees, less than 30 degree, less than 20 degree or less than 10 degrees, where the incident angles are measured in respect to the surface normal of the lightguide injection interface. There are many ways to produce collimated light including but not limited to: 1. provide an LED light source or sources with highly collimating lenses; 2. provide an LED light source or sources that are disposed inside of a reflective wedge, where the wedge has an interior angle of less than 20 degrees, less than 15 degrees or less than 10 degrees; 3. provide an LED light source or sources where the LED light sources are disposed at approximately the focal point of a compound parabolic concentrator designed to collimate the light to desired injection angles; 4. provide an LED light source or sources where emission is perpendicular to the plane of the lightguide and the light is incident on a half parabolic mirror which is designed to collimate the light injected into the lightguide; and 5. provide an LED light source or sources disposed to emit light at the surface of the lightguide, which has a surface relief structure to allow light to enter the lightguide only at supercritical angles.

A method of preparing a variable index light extraction layer comprises: providing a nanovoided polymeric layer having a first refractive index; and printing a additional material on the nanovoided polymeric layer such that the additional material substantially penetrates the nanovoided polymeric layer, thereby forming a variable index light extraction layer comprising a first region comprising a portion of the nanovoided polymeric layer and a second region comprising another portion of the nanovoided polymeric layer and the additional material; wherein the first and second regions are disposed such that for light being transported at a supercritical angle in an adjacent layer, the variable index light extraction layer selectively extracts the light in a predetermined way based on the geometric arrangement of the first and second regions.

Printing may comprise non-impact or impact printing such as inkjet printing and thermal transfer printing, and digital or analogue printing. For example, the additional material (also referred to as the additional material or another material) can be printed on the nanovoided polymeric layer using flexographic printing wherein a gravure roll having pits filled with the additional material transfers the material to a flexographic roll having a stamp with a desired arrangement of shapes. A layer of the nanovoided polymeric material is passed over and in contact with the stamp which effectively stamps or prints the web with the additional material thus transferring the additional material from the pattern of the flexographic roll to the surface of the nanovoided layer. The additional material then penetrates into the nanovoided layer, in some cases penetrating the entire thickness of the nanovoided layer. In most cases, the material is hardened by curing such as curing with UV radiation. This process can be carried out in a batch wise printing process or in continuous roll to roll process where a continuous web comprising the nanovoided polymeric layer is passed over the flexographic roll, which results in printing a repeating pattern or continuous pattern of the additional material onto the nanovoided layer.

Printing may also comprise other processes including but not limited to rotogravure printing, screen printing, inkjet printing (aqueous, solvent or solid-based inks may be used), letterpress printing, offset printing, heat transfer methods using heat sensitive substrates, thermal dye transfer and dye sublimation printing, dot-matrix printing, and printing with daisy wheels.

As mentioned above, lightguide 630 and transmissive display 620 are optically coupled with the bottom and top surfaces, 642 and 644, respectively, of the variable index light extraction layer. This optical coupling in many cases means that there are no air gaps between variable index light extraction layer 640, lightguide 630 and transmissive display 620. In reference to optical coupling with no air gaps mentioned above, it is meant that there is no continuous layer of air between the outer surfaces of each of the layers 640, 630, and 620.

Figure 7A:
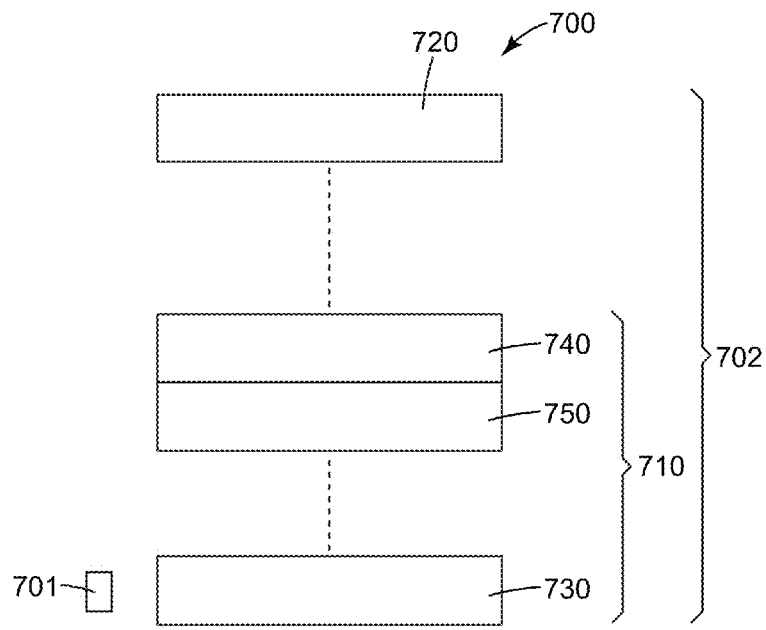

In some embodiments, the variable index light extraction layer is disposed on a transparent substrate such as any of those described above. FIG. 7*a* shows a schematic of exemplary back-lit transmissive display device 700 comprising light source 701 and back-lit transmissive display assembly 702. Back-lit transmissive display assembly 702 comprises illumination article 710 and transmissive display 720. In this embodiment, variable index light extraction layer 740 is made on transparent substrate 750. Illumination article 710 comprises lightguide 730 disposed adjacent to the transparent substrate 750. The lightguide, variable index light extraction layer and transmissive display are optically coupled as described above for FIG. 6.

Figure 7B:
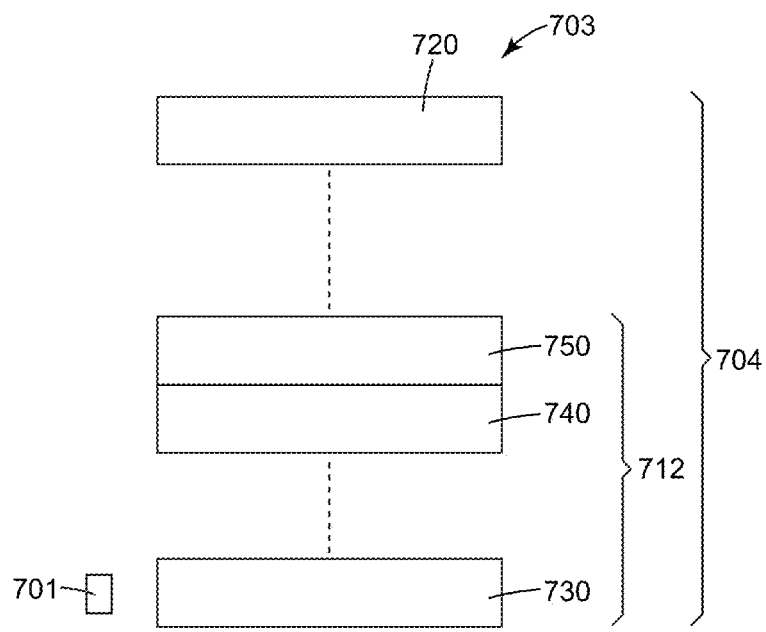

FIG. 7*b* shows a schematic of exemplary back-lit transmissive display device 703 that is similar to the device shown in FIG. 7*a*, except that the lightguide 730 is adjacent variable index light extraction layer 740. As described above for FIG. 6, transmissive display devices 700 and 703 may have no air gaps between components shown in the figures, and optically clear adhesives may be used to bond components together. For the construction shown in FIG. 7*b*, the transparent substrate 750 may have some level of haze and can provide some light scattering, as long as the scattered light is predominantly in the forward direction toward transmissive display 720. As described above in some cases an optional seal layer can be applied to the surface of the variable index light extraction layer 740 opposite the transparent substrate 750.

Figure 8A:
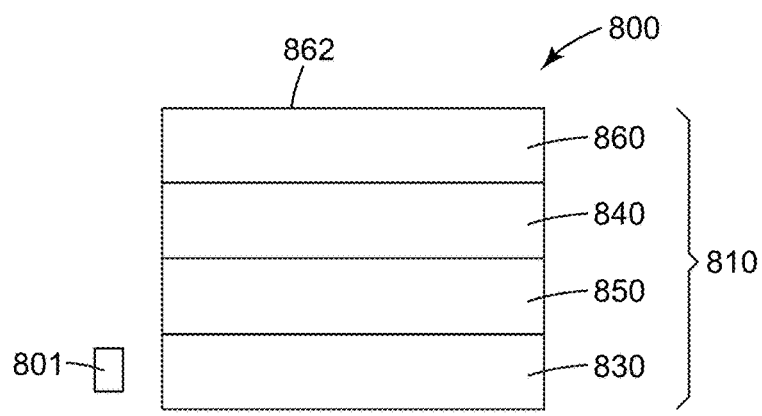
FIGS. 8a-8b, 9 and 10 show schematic cross sections of exemplary illumination devices comprising the variable index light extraction layer in combination with a light source.

The back-lit transmissive display assembly may comprise a light output layer that extracts light from the variable index light extraction layer. FIG. 8*a* shows a schematic of exemplary illumination device 800 comprising light source 801 and illumination article 810 comprising transparent substrate 850 disposed between lightguide 830 and variable index light extraction layer 840. Light output layer 860 is disposed on variable index light extraction layer 840 on a side opposite transparent substrate 850. Light output layer may comprise a seal layer for the variable index light extraction layer as describe previously. In general, light output layer 860 has a third refractive index which is greater than the first refractive index (low refractive index) of the first regions of the variable index light extraction layer. The properties of the light output layer can be adjusted such that a selected amount of light can be extracted from the lightguide. The light output layer can be used not only to extract light from the variable index light extraction layer, but also to emit light via an output surface such as light output surface 862. Light output surface 862 may also be used to bond the illumination article 810 to a display or graphic directly.

Figure 8B:
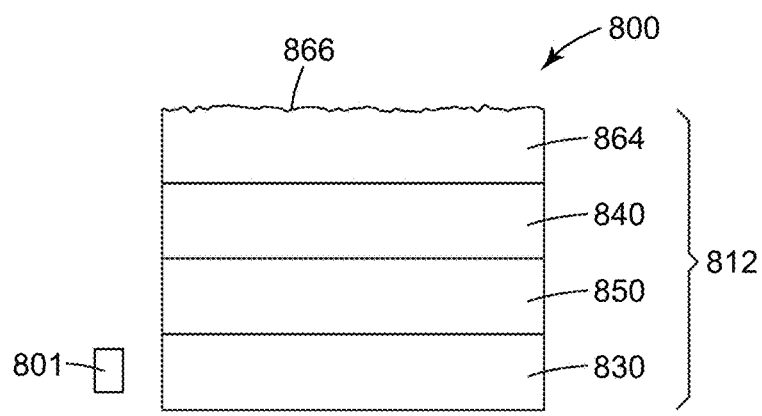

The light output surface of the light output layer may be unstructured as shown in FIG. 8*a*, or it may have any three-dimensional structure depending on the desired effect. FIG. 8*b* shows a schematic of exemplary illumination device 802 comprising light source 801 and illumination article 812 comprising transparent substrate 850 disposed between lightguide 830 and variable index light extraction layer 840. Light output layer 864 is disposed on variable index light extraction layer 840 on a side opposite transparent substrate 850. Light output layer 864 comprises light output surface 866 having an irregular or random structure such that light is emitted from surface 866 and may be diffused.

In general, the light output surface can have any number, shape, combinations of shapes, sizes, etc. of features depending on the desired effect. In some embodiments, the light output surface can have shapes such that light is emitted in one or more predetermined directions. For example, the light output surface may comprise discreet convex and/or concave lenticular features.

Exemplary features comprise protrusions and/or depressions having lenticular, prismatic, ellipsoidal, conical, parabolic, pyramidal, square, or rectangular shapes, or a combination thereof. Other exemplary features comprise refractive optical features on one face and reflective and transmissive features on the others side—said refractive features and transmissive features having a particular alignment and registration for directing light through a defined range of angles. Features comprising lenses can be particularly useful for directing light to a preferred angular distribution. Exemplary features comprising linear prisms or elongated prisms are also particularly useful. Other exemplary features comprise protrusions and/or depressions having elongated, irregular, variably sloped lenticular, or random columnar shapes, or a combination thereof. Hybrids of any combination of shapes may be used, for example, elongated parabolic, pyramidal prismatic, rectangular-based prismatic, and rounded-tip prismatic shapes. The features may comprise random combinations of shapes.

Sizes of the features may be described by their overall shapes in three dimensions. In some embodiments, each feature may have a dimension of from about 1 to about 100 um, for example, from about 5 to about 70 um. The features may be all the same shape, but the sizes of the shapes may vary in at least one dimension. The features may have different shapes, and the sizes of these features may or may not vary in any given dimension.

Surface structures of the features may also be varied. Surface structure of a feature generally refers to the substructure of the feature. Exemplary surface structures include optically smooth surfaces, irregular surfaces, patterned surfaces, or a combination thereof.

The number of features, if used, is one or more. A plurality of features, meaning at least two, may also be used. In general, any number of features may be included, e.g., 0, 1, 2, 3, 4 or 5 features; greater than 1, greater than 10, greater than 20, greater than 100, greater than 500, greater than 1000, or greater than 2000 features.

The features may be randomly arranged, arranged in some type of regular pattern, or both. The distance between features may also vary. The features may be discreet or they may overlap. The features may be arranged in close proximity to one another, in substantial contact with each other, immediately adjacent each other, or some combination thereof. A useful distance between features is up to about 10 um, or from about 0.05 um to about 10 um. The features may be offset with respect to one another, angularly as well as transversely. The areal density of the features may change over the length, width, or both.

The features may be arranged to obtain a desired optical effect. The features may be arranged to direct light extracted from the lightguide by the variable index light extraction layer in a pre-determined manner. The features may be used to control the amount and/or direction of light extracted from the viscoelastic lightguide. This can be carried out generally by varying the shape, size, surface structure, and/or orientation of the features. If a plurality of features is used, then the number and/or arrangement of the features may be varied, as well as the orientation of the features relative to each other.

In general, one may determine theoretically how varying the orientation of each feature can affect the amount and distribution of light that may be extracted from the viscoelastic lightguide. This may be carried out using ray tracing techniques consistent with the law of refraction and the principle of total internal reflection.

Figure 9:
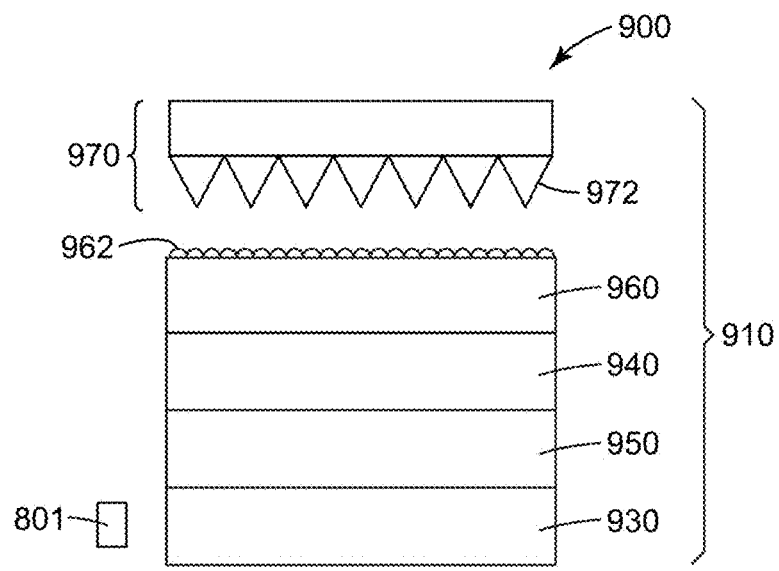

The back-lit transmissive display assembly may further comprise a turning film to redirect light emitted from the light output layer. FIG. 9*a* shows a schematic of exemplary illumination device 900 comprising light source 901 and illumination article 910 comprising transparent substrate 950 disposed between lightguide 930 and variable index light extraction layer 940. Light output layer 960 is disposed on variable index light extraction layer 940 on a side opposite transparent substrate 950. In this embodiment, illumination article 910 also comprises turning film 970 disposed to receive light from the light output layer and redirect it toward an on-axis viewer.

In some embodiments where a display or graphic is being illuminated, it is desirable to have uniform illumination of the across the area of the display or graphic. In other embodiments it may be desirable to highlight areas of a display or graphic with greater brightness. In some embodiments where a liquid crystal display is being illuminated, it is desirable for the light to be spread across a range of angles roughly centered around the axis normal or perpendicular to the plane of the lightguide. The variable index light extraction layer 940 can be patterned such that it extracts a uniform distribution of light from the lightguide across an area of the lightguide. The extracted light is emitted from light output layer 960 through the structured surface 962 and incident on microstructured surface 972 of turning film 970 such that it is redirected toward an on-axis viewer.

Turning films generally comprise a microstructured surface, and the film is disposed as part of the back-lit transmissive display assembly such that the microstructured surface faces the light output surface of the light output layer. The microstructured surface can comprise any microstructured feature (any shape or size) as long as light from the light output layer can be redirected as desired. Useful turning films comprise microstructured features that are prisms; exemplary turning films of this sort include Vikuiti™ Transmissive Right Angle Film II also known as TRAF II, and Vikuiti™ Brightness Enhanced Film also known as BEF, both available from 3M™ Company. Useful turning films also comprise microstructured features that are truncated prisms in which the sharp point of each prism has been eliminated and replaced with a flat surface at the apex of the prism as described, for example, in U.S. Pat. No. 8,827,532 (Wang et al.). In general the turning film can have any shape, size, surface structure, and/or orientation of features as long as the desired light redirecting function is achieved. If a plurality of features is used, then the number and/or arrangement of the features is used to achieve the desired light redirecting function. Turning films can be fabricated by any number of methods known by those skilled in the art. Such methods include but are not limited to fabricating a tool using engraving, embossing, laser ablation or lithographic methods, then employing the tool to create the structured film/layer via cast-and-cure or extrusion replication techniques.

Figure 10:
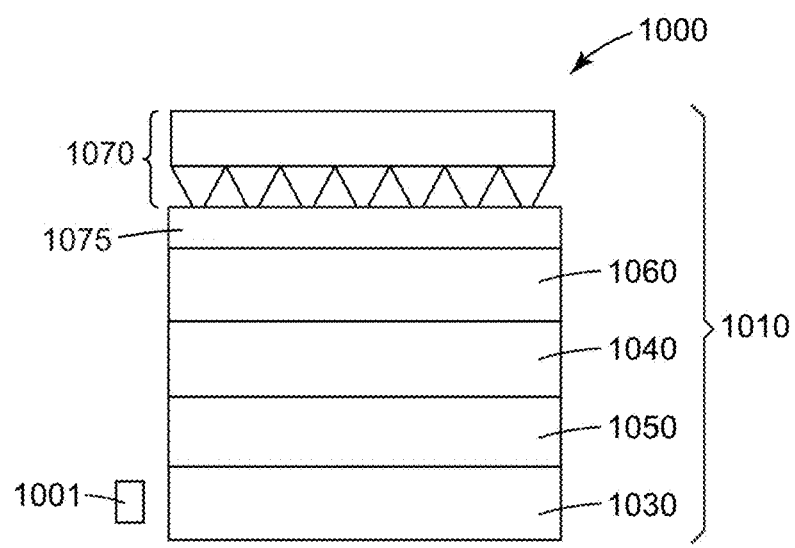

The turning film may be optically coupled to the light output layer using an adhesive. FIG. 10 shows a schematic of exemplary illumination device 1000 comprising light source 1001 and illumination article 1010 comprising transparent substrate 1050 disposed between lightguide 1030 and variable index light extraction layer 1040. Light output layer 1060 is disposed on variable index light extraction layer 1040 on a side opposite transparent substrate 1050. Turning film 1070 is optically coupled to light output layer 1060 with an adhesive layer 1075. The adhesive layer may comprise any of the PSA-based optically clear adhesives described previously for optically coupling or bonding the lightguide 630 to the variable index light extraction layer 640 in FIG. 6. Additional adhesives include 3M™ pressure-sensitive adhesive SP-7555 and L4002 pressure sensitive adhesive by KIWO, Inc. The layer may be an adhesive cured by dry process, e.g., 2-part thermally cured adhesives or UV-curable or UV-initiated and thermal cured adhesives. An example of a UV-curable adhesive, suitable as an optical adhesive is NOA65 from Norland Products, Inc. For further general description of potentially appropriate adhesives for adhesive layer 1075 used for optical coupling, see A. Pocius, *Adhesion and Adhesive Technology, An Introduction,* 2nd Ed., Hanser Gardner Publications, 2002, ISBN-1-56990-319-0.

Figure 11A:
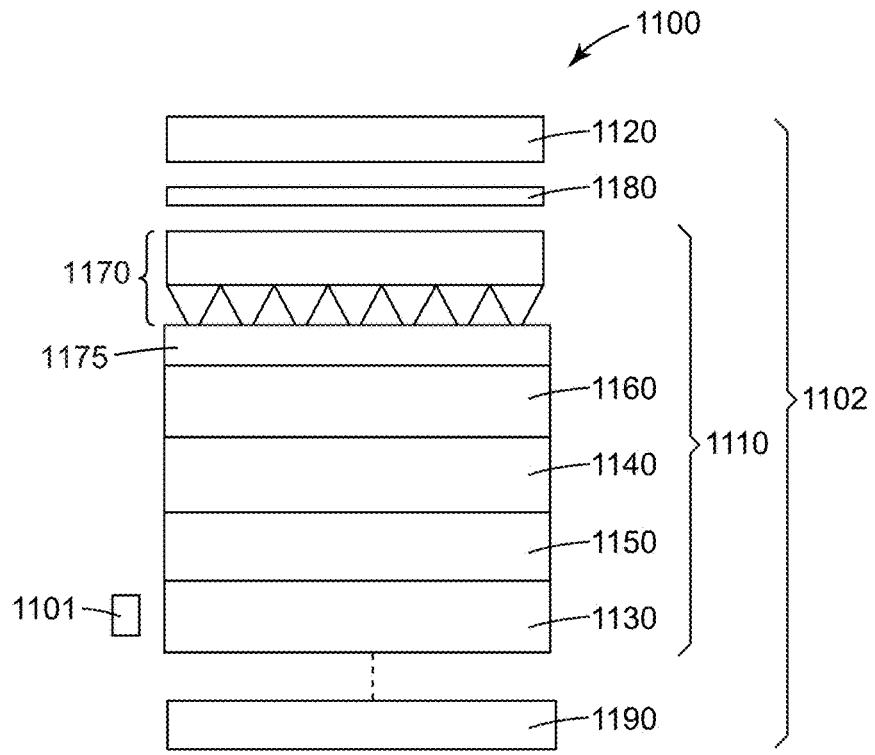
FIGS. 11a-11c show schematic cross sections of exemplary back-lit transmissive display devices comprising the variable index light extraction layer in combination with a light source and a transmissive display.

FIG. 11a shows a schematic of exemplary back-lit transmissive display device 1100 comprising light source 1101 and back-lit transmissive display assembly 1102. Back-lit transmissive display assembly 1102 comprises illumination article 1110, transmissive display 1120 and optional optical film or films 1180 disposed between the article and display. Back-lit transmissive display assembly 1102 also comprises optional backreflector 1190. Illumination article 1110 comprises lightguide 1130, variable index light extraction layer 1140 and transparent substrate 1150 disposed between the lightguide and variable index light extraction layer. Light output layer 1160 is disposed on the variable index light extraction layer 1140 on a side opposite transparent substrate 1150. Turning film 1170 is optically coupled to light output layer 1160 with adhesive layer 1175.

In some embodiments, the transmissive display 1120 comprises a transmissive display panel. In general, the transmissive display panel may comprise any type of display panel through which light is transmitted from behind the panel, and through the panel to be observed by a viewer positioned in front of the display panel, that is from the side opposite the light source. Transmissive display panels are used in a wide range of applications including handheld electronic devices, computer monitors, televisions, instrument panels, signage, etc.

In some embodiments, the transmissive display panel comprises a liquid crystal display (LCD) panel which uses the light modulating properties of liquid crystals. The imaging material used in LCD panel may comprise a one of several types of liquid crystal materials that exhibit liquid crystallinity with in the operating temperature range. In some embodiments, the imaging material comprises cholesteric liquid crystals which are chiral in nature (e.g., molecules that do not possess a mirror plane) and molecular units that are mesogenic in nature (e.g., molecules that exhibit liquid crystal phases). Cholesteric liquid crystal materials can be polymers. Cholesteric liquid crystal materials may also include achiral liquid crystal compounds (nematic) mixed with or containing a chiral unit. Cholesteric liquid crystal materials include compounds having a cholesteric liquid crystal phase in which the director (the unit vector that specifies the direction of average local molecular alignment) of the liquid crystal rotates in a helical fashion along the dimension perpendicular to the director. Cholesteric liquid crystal materials are also referred to as chiral nematic liquid crystal materials. The pitch of the cholesteric liquid crystal material is the distance (in a direction perpendicular to the director and along the axis of the cholesteric helix) that it takes for the director to rotate through 360 degrees. This distance is generally 100 nm or more.

The liquid crystal material may be dispersed as droplets in a polymer matrix; these types of displays are known as polymer liquid crystal displays (PDLC displays). PDLC displays function by applying an electric field across the imaging material such that a change in orientation of the dispersed liquid crystal droplets takes place. In one embodiment, the imaging material is translucent or hazy in the off state due to light scattering by the dispersed droplets, and when the electric field is applied, a refractive index mismatch between the liquid crystalline droplets and the polymeric matrix decreases such that the imaging material becomes transparent or substantially transparent. The first and second transparent electrodes are connected to a power supply by leads (not shown) for generating the electric field.

Another type of liquid crystal display are guest-host liquid crystal displays which use dichroic dyes. The dye molecules are elongated in shape and are dissolved in the liquid crystal. The dye molecules tend to orient along the director of the liquid crystal, the guest-host interaction, in that the dye molecules are the "guest" molecules being oriented by the "host" molecules. The dichroic properties of certain dye molecules can be utilized for display purposes by applying electric fields to the liquid crystal and causing reorientation of both the liquid crystal and the dye molecules. The guest-host liquid crystal material is disposed between two plates having first and second electrodes. The orientation switches the liquid crystal such that the dye goes from an oriented state where it absorbs incident light to and state where the dye molecule become disordered and allow for light transmission through the liquid crystal cell. Details of guest-host liquid crystal displays can be found in the book written by P. J. Collings, *Liquid Crystals, Nature's Delicate Phase of Matter*, Princeton University Press, 1990, ISBN 0-691-02429-4.

The transmissive display may also comprise a standard liquid crystal panel as used in a number of display applications including computer monitors, laptops, handheld devices, and LCD TVs. In such devices the liquid crystal (LC) panel typically includes a layer of liquid crystal disposed between panel plates. The plates are often formed of glass and may include electrode structures and alignment layers on their inner surfaces for controlling the orientation of the liquid crystals in the LC layer. These electrode structures are commonly arranged so as to define LC panel pixels, i.e., areas of the LC layer where the orientation of the liquid crystals can be controlled independently of adjacent areas. A color filter may also be included with one or more of the plates for imposing color on the image displayed by the LC panel.

The LC panel is positioned between an upper absorbing polarizer and a lower absorbing polarizer. The upper and lower absorbing polarizers are located on opposite outer sides of the LC panel. The absorbing polarizers and the LC panel in combination control the transmission of light from a backlight through the display system to the viewer. For example, the absorbing polarizers may be arranged with their transmission axes perpendicular to each other. In an unactivated state, a pixel of the LC layer may not change the polarization of light passing therethrough. Accordingly, light that passes through the lower absorbing polarizer is absorbed by the upper absorbing polarizer. When the pixel is activated, the polarization of the light passing therethrough is rotated so that at least some of the light that is transmitted through the lower absorbing polarizer is also transmitted through the upper absorbing polarizer. Selective activation of the different pixels of the LC layer, for example, by an electronic controller, results in the light passing out of the display system at certain desired locations, thus forming an image seen by the viewer. The controller may include, for example, a computer or a television controller that receives and displays television images.

One or more optional layers may be provided proximate the upper absorbing polarizer, for example, to provide mechanical and/or environmental protection to the display surface. In one exemplary embodiment, the layer may include a hardcoat over the upper absorbing polarizer.

It will be appreciated that some types of LC displays may operate in a manner different from that described above. For example, the absorbing polarizers may be aligned parallel and the LC panel may rotate the polarization of the light when in an unactivated state. Regardless, the basic structure of such displays remains similar to that described above.

The liquid crystal display panel can also comprise a transflective panel, where the LC display panel can be illuminated by a backlight but can also be viewed by illuminating the display with a front light or ambient lighting source, for example the sun. Such displays are well known. Pixel Qi is one of the manufacturers of transflective LC displays panels. The panels can be set to operate under transflective mode (thus needs lower backlight than normal LCDs) and reflective mode (requires only ambient light)—for eye-comfort, power-saving, and visibility under bright ambient light.

Transmissive display panels can include electrofluidic displays such as an electrowetting display, a relatively new technology, originally described in "Video-Speed Electronic Paper Based on Electrowetting" by R. A. Hayes and B. J. Feenstra in Nature, Vol. 425, 383-385 (25 Sep. 2003) and developed by Liquavista BV. Electrowetting displays comprise a transparent electrode, hydrophobic insulator, a colored oil layer and water, sandwiched between glass or polymeric substrates. In equilibrium the colored oil naturally forms a stable continuous film between the water and the hydrophobic insulator. When a voltage difference is applied across the hydrophobic insulator, the system lowers its energy by moving the water into contact with the insulator, thereby displacing the oil and exposing the underlying reflecting surface. The balance between electrostatic and surface tension forces determines how far the oil is moved to the side. In this way the optical properties of the stack when viewed from above can be continuously tuned between a colored off-state and a transparent on-state, provided the pixel is sufficiently small so that the eye averages the optical response.

Another example of an electrofluidic display are electrofluidic displays made using "Young-Laplace Transposition of Brilliant Pigment Dispersions" described by J. Heikenfeld et al. in Nature Photonics, Vol. 3, 292-296 (26 Apr. 2009). The technology is being developed by Gamma Dynamics. The technology is a three dimensional microfluidic display device that provides a direct view of brilliantly coloured pigment dispersions. The basic electrofluidic structure has several important geometrical features. The first is a reservoir that will hold an aqueous pigment dispersion in less than 5-10% of the visible area. The second feature is a surface channel occupying 80-95% of the visible area; this receives the pigment dispersion from the reservoir when a suitable stimulus is applied. Third, there is a duct surrounding the device that enables counterflow of a nonpolar fluid (oil or gas) as the pigment dispersion leaves the reservoir. It is important to note that all of these features are inexpensively formed in a single photolithographic or microreplication step. Several additional coatings and a top substrate are added to the reservoir structure. The surface channel is first bound by two electrowetting plates consisting of an electrode and hydrophobic dielectric. The top electrowetting plate is composed of a transparent conducting electrode so that the surface channel may be viewed by the naked eye. The bottom electrowetting plate comprises a highly reflective electrode made from aluminium, for example. This bottom electrode though can be a transparent electrode to produce a transmissive display panel that can be backlit. With this arrangement, when no voltage is applied, a net Young-Laplace pressure causes the pigment dispersion to occupy the cavity, which imparts a larger radius of curvature on the pigment dispersion. Therefore at equilibrium, the pigment dispersion occupies the reservoir and is largely hidden from view. This is analogous to connecting two soap bubbles by a straw—the larger bubble has a larger radius of curvature and a lower Young-Laplace pressure, and will therefore consume the smaller bubble. When a voltage is applied between the two electrowetting plates and the pigment dispersion, an electromechanical pressure is induced that exceeds the net Young-Laplace pressure, and the pigment dispersion is pulled into the surface channel. If the volume of the pigment dispersion is slightly greater than the volume of the surface channel, then the pigment will be simultaneously viewable in both the reservoir and the surface channel, and nearly the entire device area will exhibit the coloration of the pigment. If the voltage is removed the pigment dispersion rapidly (milliseconds to tens of milliseconds) recoils into the reservoir. Thus a switchable device is created that can hide the pigment or reveal the pigment.

The transmissive display panel may comprise a transmissive electrophoretic display. Most known electrophoretic displays are reflective displays, however, transmissive displays are becoming more popular. An exemplary transmissive electrophoretic display is described in "Novel Flexible Reflective Color Media With Electronic Inks" described by Koch et al. in *Journal of Information Display*, Vol. 12, No. 1, 5-10 (March 2011). The technology approach of 'Print' rather than 'Display' in system architectures by layering subtractive colorants (CMYK) to allow every available color at every addressable pixel location. This system of electronically addressable layered colorants to achieve saturated color is similar to the subtractive primary approach adopted by the printing industry. Layered colorants in eMedia can be enabled by stacking electro-optic layers that are modulated between colored and transparent optical states. The optical and electrical performance of individual electro-optic layers is critical to the overall performance of a stacked color system. a novel electro-optic device with optically transparent and colored states using hybrid architecture adopting out-of-plane switching fields with in-plane optical effects and proprietary electronic inks of primary subtractive colorants.

The transmissive display panel may comprise a microelectromechanical-based (MEMS-based) display based on a MEMS pixel light modulator. For example, the transmissive display panel may comprise a Pictronix DMS™ (Digital Micro Shutter) display panel made by Pixtronix, Inc. wherein digital micro shutters are used to replace liquid crystals to deliver high-speed light modulation. A backplane using standard thin film transistor (TFT) processes is fabricated with indium tin oxide transparent conductor. Using materials and processes already found in a TFT fabrication line and multiple-mask process, the MEMS pixel light modulator is built on top of the active backplane. This results in an array of MEMS apertures replacing the color filter and is aligned and bonded to the backplane. This new display technology is described, for example, in a white paper from Pixtronix, Inc. entitled "Pixtronix DMS™ Display Technology: Ultra-Low Power Consumption and Exceptional Video Image Quality" by Hagood et al. (2008).

As shown in FIG. 11a, when the display comprises a traditional LC display panel, optical film or films 1180 may be employed. These optical films can improve the efficiency of the display device. The optical film may comprise a multilayer optical film. The optical film may comprise a reflective polarizer film, diffuse blend reflective polarizer film, diffuser film, brightness enhancing film, microlens film, or combination thereof. Useful optical films include commercially available optical films marketed as Vikuiti™ Dual Brightness Enhanced Film (DBEF), Vikuiti™ Brightness Enhanced Film (BEF), Vikuiti™ Diffuse Reflective Polarizer Film (DRPF), Vikuiti™ Enhanced Specular Reflector (ESR), Vikuiti™ Advanced Polarizing Film (APF), all available from 3M™ Company. Useful optical films are also described in U.S. Pat. Nos. 5,825,543; 5,867, 316; 5,882,774; 6,352,761 B1; 6,368,699 B1; 6,927,900 B2; U.S. 2006/0084780 A1; 2001/0013668 A1; U.S. Ser. No. 09/229,724; WO 95/17303; WO 95/17691; WO95/17692; WO 95/17699; WO 96/19347; WO 97/01440; WO 99/36248; and WO99/36262. These optical films are merely illustrative and are not meant to be an exhaustive list of suitable optical films that can be used.

As shown in FIG. 11a, a back reflector 1190 may be employed to recycle light in the device. Suitable back reflectors include specular, semispecular and diffuse materials. In some embodiments, the back reflector comprises a specular reflector wherein light incident upon a surface is reflected by the surface, such that the reflection angle, $\square_r$, is the same as or nearly the same as the incident angle, $\square_i$, wherein both angles are defined relative to a plane of the surface. For a specular reflector, the reflection angle of light is within about 16° of the incident angle. A specular reflector may be fully or near fully specular as a reflector over some range of incident angles. Also, specular reflectors may be from about 85 to about 100% reflective, from about 90 to about 100%, or from about 95 to about 100%, across a particular region of the electromagnetic spectrum, for example, the visible region.

Suitable specular reflectors include mirrors such as a plane mirrors comprising a film of reflecting material, typically a metal, coated on glass. Suitable reflectors include mirrors that are multilayer optical films as described, for example, in the references cited above. Exemplary specular reflectors include those available from 3M™ Company, for example, 3M™ High Intensity Grade Reflective Products such as High Reflective Visible Mirror Film and High Transmission Mirror Film, and Vikuiti™ films such as Vikuiti™ Enhanced Specular Reflector.

In some embodiments, the back reflector comprises a semispecular reflector where light of a given incident angle reflects with multiple reflection angles but very little to no light is reflected back in the direction of the incident light.

In some embodiments, the back reflector comprises a diffuse reflector wherein light within the device is reflected and scattered at a surface of the diffuse reflector. For a diffuse reflector, light of a given incident angle reflects with multiple reflection angles wherein at least some of the reflection angles are greater than about 16° of the incident angle and some of the reflected light is directed at angles in the direction of the light source. A diffuse reflector may be fully or near fully reflective over some range of incident angles. Also, diffuse reflectors may be from about 85 to about 100% reflective, from about 90 to about 100%, or from about 95 to about 100%, across a particular region of the electromagnetic spectrum, for example, the visible region.

A diffuse reflector may comprise an irregular surface with respect to the wavelength of light being reflected. Light may be reflected at the surface. The diffuse reflector may comprise a layer of organic, inorganic or hybrid organic/inorganic particles disposed on a substrate. The particles may have a diameter of from greater than about 0.01 to about 100 um, from greater than about 0.05 to about 100 um, or from greater than about 0.05 to about 50 um. The particles may be polymeric particles, glass beads, inorganic particles, metal oxide particles, or hybrid organic/inorganic particles. The particles may be solid, porous or hollow. The particles may comprise microspheres having a polymeric shell with a blowing agent such as isobutene or isopentane inside the shell, for example, microspheres available as EXPANCEL microspheres from Expancel Co.

The particles may be dispersed in a polymeric material or binder. Binders include one or more polymers and may be, for example, any of the viscoelastic materials and adhesive materials (cold seal adhesives, etc.) described above. The binder may comprise a PSA. In some embodiments, the binder is light transmissive such that at least some of the light incident upon the layer enters the layer and becomes diffused. The binder and particles may be coated onto a substrate such that the thickness of the binder is greater than, less than or about the same as the diameter of the particles. The substrate may comprise a polymer, metal, specular reflector, and the like.

The refractive indices of the particles and binder may be significantly different. For example, the refractive indices of the particles and binder may differ from about 0.002 to about 1, or from about 0.01 to about 0.5. This type of diffuse reflector may be from about 85 to about 100% reflective, from about 90 to about 100%, or from about 95 to about 100%, across a particular region of the electromagnetic spectrum, for example, the visible region. Exemplary light diffusing materials are described in U.S. Pat. No. 6,288,172 B1 (Goetz et al.). For example, the particles may comprise hollow glass spheres having a mean diameter of about 18 um (SPHERICEL Grade 60P18 from Potters Industries Inc.), and the binder may comprise a PSA such as a silicone PSA.

In some embodiments, the diffuse reflector comprises a layer of barium sulfate particles loaded in a polyethylene terephthalate film. Other constructions that provide a reflective surface are described in U.S. Pat. No. 7,481,563 (David et al.) The diffuse reflector may also comprise a voided polymer film where the void sizes cause significant light scattering.

Figure 11B:
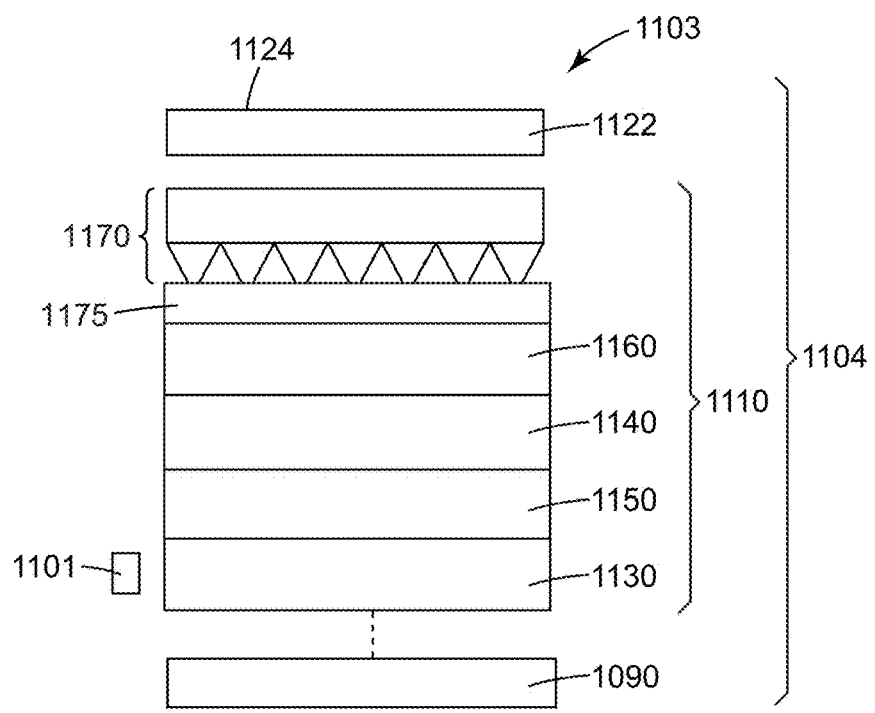

In some embodiments, the transmissive display comprises a transmissive or semi-transmissive substrate that defines a graphic or static image such that the back-lit transmissive display device can be used in graphic arts applications. FIG. 11b shows a schematic cross section of exemplary transmissive display device 1103 comprising light source 1101 and back-lit transmissive display assembly 1104. Back-lit transmissive display assembly 1104 comprises illumination article 1110 as described above for FIG. 11a. Back-lit transmissive display assembly 1104 also comprises transmissive display 1122 which comprises a transmissive or semi-transmissive substrate that defines a graphic film or static image.

The graphic or static image generally comprises black and/or colored imaging material included on or embedded in a transmissive or semi-transmissive substrate such as one or more polymeric film, glass, etc. The image may be made by depositing imaging material on a surface of a substrate or between two substrates, for example, using some form of printing means. The image may also be made by suspending imaging material in bulk material which forms a substrate. Imaging materials include particles such as pigments or dyes such that certain regions reflect or transmit light within a particular range of wavelengths. Fluoroescent materials may also be used.

Figure 11C:
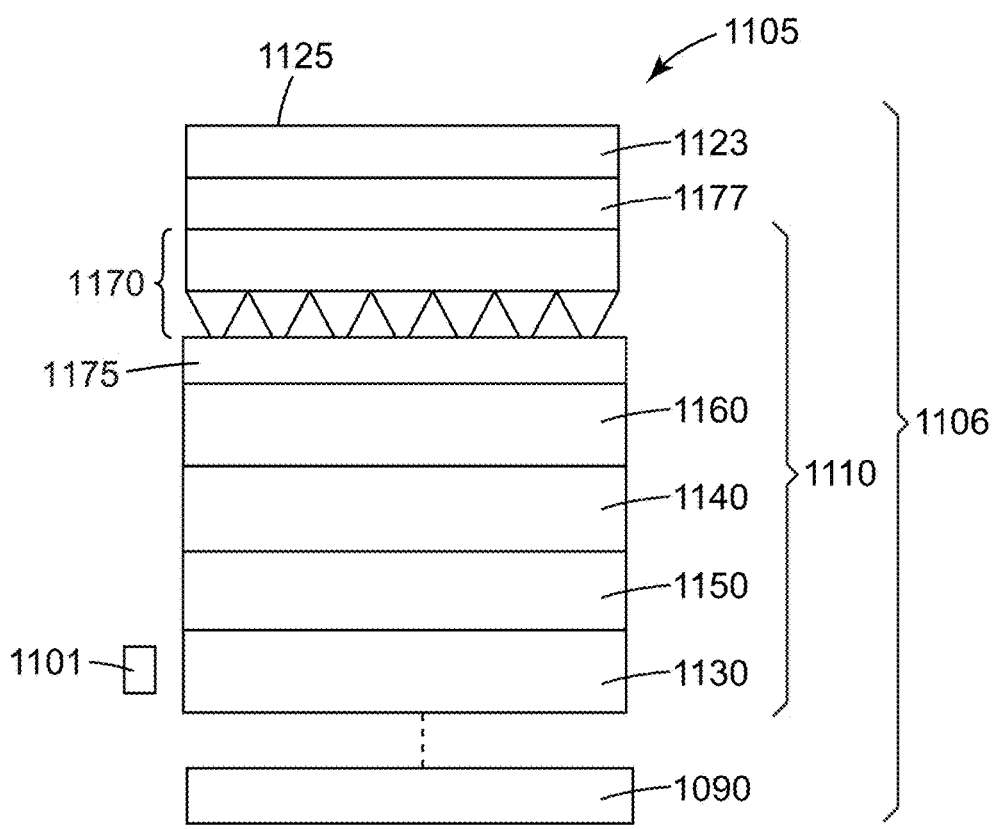

The transmissive display may be directly bonded to the illumination article such that the two are optically coupled. FIG. 11c shows a schematic cross section of exemplary transmissive display device 1105 comprising light source 1101 and back-lit transmissive display assembly 1106. Back-lit transmissive display assembly 1106 comprises illumination article 1110 as described above for FIG. 11a. Back-lit transmissive display assembly 1106 also comprises transmissive display 1123 which may comprise a transmissive display panel or graphic or static image as described above for FIGS. 11a and 11b, respectively. Illumination article 1110 is directly bonded to transmissive display 1123 with adhesive layer 1177. The adhesive layer may comprise any of the optically clear adhesives described above.

The illumination articles disclosed herein are also useful for backlighting flexible displays that are non-planar in nature, for example backlighting of active matrix flexible displays and displays on curved or contoured surfaces.

EXAMPLES

The following materials were used.

| Component | % Solid |
|---|---|
| A-174 Silica Nalco 2327 in 1-methoxy-2-propanol, Ondeo Nalco Chemical Co. | 43.40 |

-continued

| Component | % Solid |
|---|---|
| Aliphatic Urethane Acrylate, available from Sartomer Corporation as CN 9893 | 100.00 |
| Pentaerythritol Triacrylate, available from Sartomer Corporation as SR 444 | 100.00 |
| Propylene Glycol Methyl Ether, available from Dow Chemical as DOWANOL PM | — |
| Ethyl Acetate, available from Sigma-Aldrich | — |
| Photoinitiator, available from BASF Corporation as IRGACURE 184 | 100.00 |
| Photoinitiator, available from BASF Corporation as IRGACURE 819 | 100.00 |

Preparation of A-174 Nalco 2327 Silica Nanoparticles

In a 2 L three neck flask, equipped with a condenser and a thermometer, 750 g of Nalco 2327 colloidal silica (40% wt solid, available from Nalco Chemical Company, Naperville Ill.) and 700 g of 1-methoxy-2-propanol were mixed together under rapid stirring. After that, 61.59 g of Silquest A-174 silane (available from GE Advanced Materials, Wilton Conn.) was added, and then the mixture was stirred for 10 min., followed by addition of 400 g of 1-methoxy-2-propanol. The mixture was heated at 85° C. for 6 hours using a heating mantle. The resulting solution was allowed to cool down to room temperature. The water and some of the 1-methoxy-2-propanol was removed under vacuum using a rotary evaporator and a 60° C. water bath. The resulting sol was a clear dispersion that was 43.4% wt A-174 modified 20 nm silica in 1-methoxy-2-propanol.

Preparation of Coating Formulation

The following were added in a 1-liter wide-mouth amber bottle: 5.70 g of CN 9893 and 22.40 g of SR 444. The bottle was capped and shaken for 2 hours to dissolve CN9893 (batch is clear). This solution is referred to as Resin Premix.

The following were added to a 2000 mL poly bottle: 482.84 g of the sol prepared as described above and the Resin Premix. The two components were mixed by transferring the batch back and forth between two bottles, ending with the batch in the 2000 mL bottle. To the 2000 mL bottle was added 5.84 g of IRGACURE 184 and 1.12 g of IRGACURE 819. The solution was shaken for 30 minutes to dissolve photoinitiators. The resulting batch was a translucent, low-viscosity dispersion.

The dispersion was diluted to ~17.7% solids by weight with a 50/50 blend ethyl acetate and DOWANOL PM.

Preparation of Nanovoided Polymeric Layer

The above coating formulation was coated onto 50 um PET film (MELINEX 617 available from DuPont) using a slot die at a line speed of 3.1 m/min. The wet coating thickness was approximately 8.1 um. In an inert chamber (<50 ppm $O_2$), the wet coating was partially cured in-line at the same line speed with UV radiation at 395 nm and dose of 850 mJ/cm$^2$. (UV radiation was provided by UV-LEDs available from Cree, Inc.). The partially cured coating sample was then dried at 70° C. in a 9 meter oven, and under a nitrogen-purged atmosphere, finally cured with a 236 Watt/cm$^2$ Fusion H bulb (available from Fusion UV Systems, Inc.). The resulting nanovoided polymeric layer had a thickness of 1.3 um. The transmission was 96.4%, the haze was 1.33% and the clarity was 99.7% as measured using a BYK gardner Haze Gard Plus (Columbia, Md.). The refractive index of the nanovoided layer was between 1.200 and 1.220 as measured at 589 nm using a Metricon Prism Coupler (Metricon Corporation, Pennington, N.J.).

Formation of Variable Index Light Extraction Layer on Transparent Substrate

The nanovoided polymeric layer was printed with a UV curable clear ink (UV OP1005 GP Varnish from Nazdar, Shawnee, Kans.) using an indirect gravure printing process. A flexographic tool having a random 100 um gradient dot pattern having a density gradient of second regions in the x direction (left to right) and a varying density in the y direction at the left edge of the pattern as shown in FIG. 12a was fabricated (by Southern Graphics Systems) based on a pdf image that defined the dot pattern determined by optical ray tracing modeling. A gravure roll (pyramidal and 9 cubic um per square um) was rated to give a wet coating of approximately 9.65 um. The printing was done at 10 meters per minute with high intensity UV curing under a nitrogen-purged atmosphere with a 236 Watt/cm$^2$ Fusion H bulb (available from Fusion UV Systems, Inc.) after the printing. The resulting printed layer was an optical film comprising: first regions having a first refractive index and comprising nanovoided polymeric material, and second regions wherein the nanovoids are filled or partially filled with the cured clear ink, the second regions having a second refractive index greater than that of the first regions. The variable index light extraction layer having first and second regions disposed on the DuPont 617 PET substrate is shown in FIG. 12b. The optical properties of the variable index light extraction layer on PET were measured using a BYK Gardner Haze Gard Plus (Columbia, Md.) on two areas, the area with low density of second high index regions and the area with high density of high index regions. For the low density area, the transmission was 96.6%, the haze was 3.56%, the clarity was 95.6%. For the high density area, the transmission was 95.8%, the haze was 6.82%, the clarity was 89.9% (note the transmission is not corrected for Fresnel reflection). The refractive index of the cured ink was measured to be approximately 1.525 as measured on a flat cured sample using a Metricon Prism Coupler (Metricon Corporation, Pennington, N.J.). The wavelength of light used to measure the refractive index was 589 nm.

Prismatic Turning Film

Figure 13:
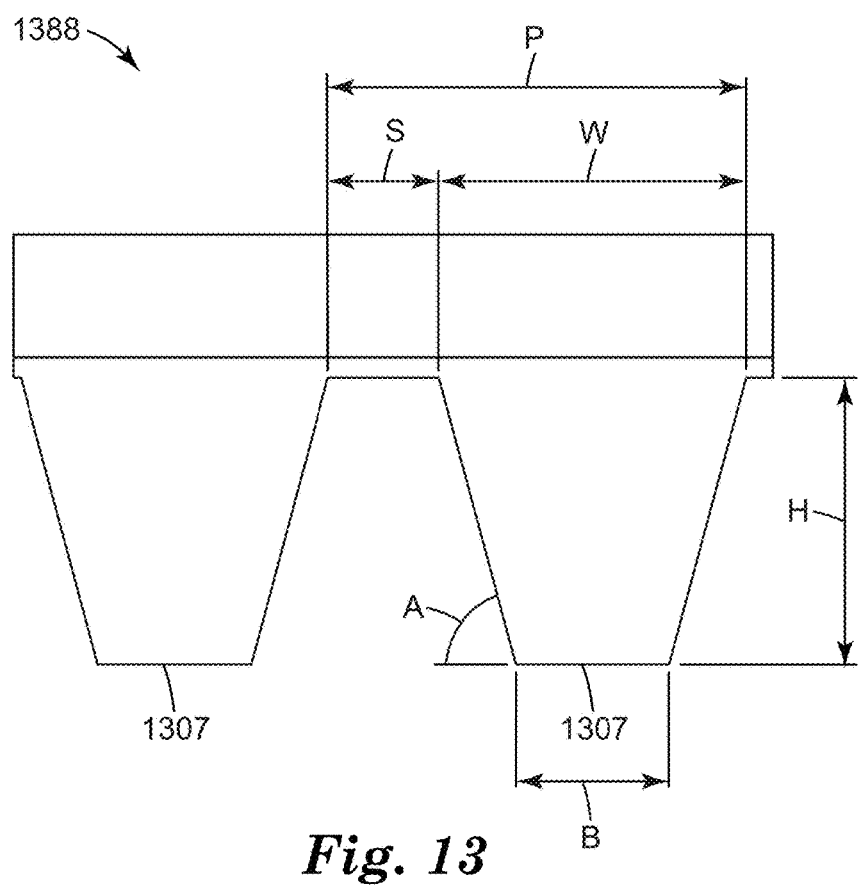
FIG. 13 shows a schematic cross section of an exemplary turning film.

A prismatic turning film was made using a cast and cure microreplication process. The microreplication tool used was a 1-dimensional structured film tool (tool designed to yield linearly extending truncated prisms) was made by a diamond-turning process where a metallic cylindrical tool pattern was cut into the copper surface of the tool using a precision diamond turning machine. The resulting copper cylinder with precision cut features was chrome plated. A film replicate was made using an acrylate resin composition comprising acrylate monomers (75% by weight PHOTOMER 6210 available from Cognis and 25% by weight 1,6-hexanedioldiacrylate available from Aldrich Chemical Co.) and a photoinitiator (1% by weight Darocur 1173, Ciba Specialty Chemicals) that was cast onto a 76 um PET film (MELINEX 617 available from DuPont) and then cured against the precision cylindrical tool using ultraviolet light 236 Watt/cm$^2$ Fusion H bulb (available from Fusion UV Systems, Inc.). Each feature of the turning film has a trapezoid cross section as illustrated in FIG. 13, and the geometric parameters are illustrated in Table 1.

TABLE 1

| Geometric parameters for truncated prism turning film | | | | | |
|---|---|---|---|---|---|
| Pitch (P) (μm) | Height (H) (μm) | Slope Angle (A) (°) | Spacing (S) (μm) | Bottom Flat (B) (μm) | Top (W) (μm) |
| 50.00 | 24.59 | 56.00 | 2.21 | 14.62 | 47.79 |

Illumination Device

An illumination article as shown in FIG. 10 was made using a 90 mm wide by 120 mm long by 2 mm-thick optically clear acrylic lightguide (Astra Products, Inc), the variable index light extraction layer on transparent substrate described above, and the truncated prismatic turning film also described above and shown in FIG. 13. Note that while not used in this experimental example, an additional seal layer as described above can be part of the variable index light extraction layer assembly. The lightguide was optically coupled to the transparent substrate using 1 mil optically clear adhesive (3M™ Optically Clear Laminating Adhesives 8171). The turning film was optically coupled to the variable index light extraction layer using the same adhesive such that the tips of the truncated prisms (1307 shown in FIG. 13) contacted the adhesive layer.

Figure 14A:
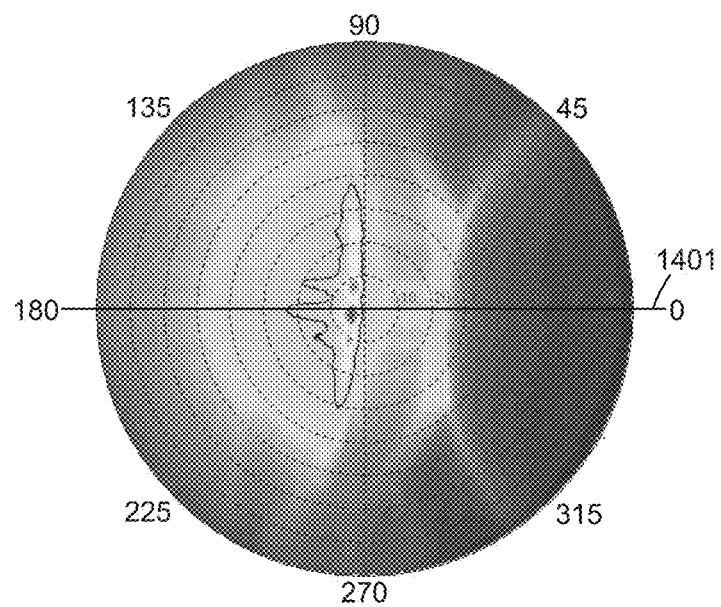
FIG. 14a shows a two-dimensional polar plot image showing light distribution from an exemplary illumination device which can be used to back-light a transmissive display.
Figure 14B:
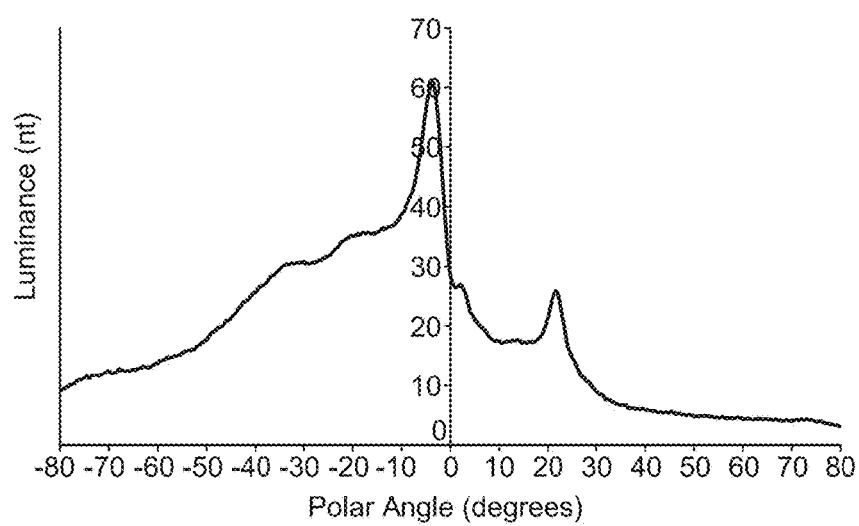

A light engine assembly consisting of 5 edge-emitting LEDs 1001 (NSSW230T Nichia white, available from NICHIA AMERICA CORPORATION, Wixom, Mich.) were mounted in a bezel with 2 reflectors (multilayer polymeric mirror film, Vikuiti™ ESR film available from 3M Company, St. Paul, Minn.). A slight angle of around 10 deg. was built into the reflective bezel for optical collimation. Measurements were made of the angular light distribution from the top surface of the lightguide assembly using a Conoscope (ELDIM EZContrast L80, available from ELDIM S.A., France). FIG. 14a shows a 2-D polar plot image showing the light distribution from the illumination device. FIG. 14b shows a cross-sectional luminance graph along the line 1401 shown in FIG. 14a. With this lightguide construction, the optical power is extracted at the top surface into air and is collimated. This illumination device can be used as a backlight for a variety of displays as described previously.

Back-Lit Transmissive Display Device

A back-lit transmissive display device is made as shown in FIG. 11c. The illumination device described above is directly bonded to an LC display using an optically clear adhesive (3M™ Optically Clear Laminating Adhesives 8171), and the display is illuminated uniformly.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An illumination article comprising a lightguide and a variable index light extraction layer, the variable index light extraction layer optically coupled to the lightguide, the variable index light extraction layer having first and second regions, the first region comprising nanovoided polymeric material, the second region comprising the nanovoided polymeric material and an additional material disposed within the nanovoided polymeric material, the first region having a first refractive index, the second region having a second refractive index, the additional material increasing the second refractive index over the first refractive index by at least about 0.03, the first and second regions being disposed such that for light emitted by a light source and injected into the lightguide, the variable index light extraction layer selectively extracts the light in a predetermined way based on the geometric arrangement of the first and second regions, wherein the nanovoided polymeric material comprises a plurality of interconnected nanovoids.

2. The illumination article of claim 1, wherein a difference between the second and first refractive indices is about 0.03 to about 0.5.

3. The illumination article of claim 1, wherein the first refractive index is less than about 1.4.

4. The illumination article of claim 1, wherein the first region has a void volume of about 20 to about 60%.

5. The illumination article of claim 1, wherein the first region has a haze less than about 5% and a clarity greater than about 90%.

6. The illumination article of claim 1, wherein the second region has a void volume of less than about 20%.

7. The illumination article of claim 1, wherein the variable index light extraction layer has a light transmittance of greater than about 90%.

8. The illumination article of claim 1, wherein the variable index light extraction layer has a haze less than about 10% and a clarity greater than about 90%.

9. The illumination article of claim 1, further comprising a back reflector proximate a major surface of the lightguide for reflecting light emitted by the lightguide.

10. The illumination article of claim 1, further comprising a reflective polarizer disposed on the lightguide.

11. The illumination article of claim 1, wherein at least 60% of the nanovoids have a size not greater than about 70 nm.

12. The illumination article of claim 1 being flexible.

13. A back-lit transmissive display device comprising the illumination article of claim 1 and a transmissive display optically coupled to the variable index light extraction layer, wherein the transmissive display is flexible.

14. The back-lit transmissive display device of claim 13, wherein the transmissive display is an active matrix flexible display.

15. A back-lit transmissive display device comprising the illumination article of claim 1 and a transmissive display optically coupled to the variable index light extraction layer, wherein the transmissive display is non-planar.

16. A back-lit transmissive display device comprising the illumination article of claim 1 and a transmissive display optically coupled to the variable index light extraction layer, wherein the transmissive display comprises a transmissive or semi-transmissive substrate that defines a graphic or static image.

17. The back-lit transmissive display device of claim 16, wherein the graphic or static image comprises one or both of black and colored imaging material included on or embedded in the transmissive or semi-transmissive substrate.

18. The back-lit transmissive display device of claim 16, wherein the transmissive or semi-transmissive substrate comprises a polymeric film.

19. The illumination article of claim 1, wherein the lightguide is a viscoelastic light guide.

* * * * *

UNITED STATES PATENT AND TRADEMARK OFFICE
CERTIFICATE OF CORRECTION

Page 1 of 2

PATENT NO. : 10,295,724 B2
APPLICATION NO. : 15/292817
DATED : May 21, 2019
INVENTOR(S) : David Thompson It is certified that error appears in the above-identified patent and that said Letters Patent is hereby corrected as shown below:

In the Specification

Column 5

Line 21, delete "$\daleth_c$" and insert -- $\theta_c$ --, therefor.
Line 24, delete "$\square_c$," and insert -- $\theta_c$, --, therefor.
Line 65, delete "$n_\square$" and insert -- $n_1$ --, therefor.
Line 67, delete "$n_\square$" and insert -- $n_1$ --, therefor.

Column 6
Line 6, delete "$n_\square$" and insert -- $n_1$ --, therefor.
Line 63, delete "permittivity $\square_v$," and insert -- permittivity $\varepsilon_v$, --, therefor.
Line 63, delete "$n_v^2=\square_v$," and insert -- $n_v^2=\varepsilon_v$, --, therefor.
Line 64, delete "$\square_b$," and insert -- $\varepsilon_b$, --, therefor.
Line 65, delete "$n_v^2=\square_b$" and insert -- $n_v^2=\varepsilon_b$ --, therefor.

Column 7
Line 7, delete "$\square_{eff}$" and insert -- $\varepsilon_{eff}$ --, therefor.
Line 15, delete "$\square/5$," and insert -- $\lambda/5$, --, therefor.
Line 15, delete "$\square/6$," and insert -- $\lambda/6$, --, therefor.
Line 16, delete "$\square/8$," and insert -- $\lambda/8$, --, therefor.
Line 16, delete "$\square/10$," and insert -- $\lambda/10$, --, therefor.
Line 17, delete "$\square/20$," and insert -- $\lambda/20$, --, therefor.
Line 17, delete "where $\square$ is" and insert -- where $\lambda$ is --, therefor.
Line 43, delete "$\square_{eff}$" and insert -- $\varepsilon_{eff}$ --, therefor.
Line 46, delete "$\square_{eff}=f\square_v+ (1-f) \square_b$" and insert -- $\varepsilon_{eff}=f \varepsilon_v+ (1-f) \varepsilon_b$ --, therefor.

Column 10
Line 32, delete "$\square/5$," and insert -- $\lambda/5$, --, therefor.
Line 32, delete "$\square/6$," and insert -- $\lambda/6$, --, therefor.

Signed and Sealed this
Twenty-sixth Day of November, 2019

Andrei Iancu
*Director of the United States Patent and Trademark Office*

Line 33, delete "□/8," and insert -- λ/8, --, therefor.
Line 33, delete "□/10," and insert -- λ/10, --, therefor.
Line 34, delete "□/20," and insert -- λ/20, --, therefor.
Line 34, delete "where □ is" and insert -- where λ is --, therefor.

Column 17
Line 29, delete "polystryrene," and insert -- polystyrene, --, therefor.
Line 37, delete "stereoisomers, and polyolefinss" and insert -- stereoisomers, and polyolefins --, therefor.

Column 18
Line 23, delete "Dalquist" and insert -- Dahlquist --, therefor.
Line 31, delete "Win," and insert -- g/in, --, therefor.

Column 19
Line 59, delete "Dalquist" and insert -- Dahlquist --, therefor.

Column 23
Line 27, delete "less that" and insert -- less than --, therefor.

Column 31
Line 64, delete "□$_r$," and insert -- $\theta_r$, --, therefor.
Line 65, delete "□$_t$," and insert -- $\theta_t$, --, therefor.

Column 33
Line 39, delete "Fluoroescent" and insert -- Fluorescent --, therefor.